US011850941B2

(12) United States Patent
Suzuki et al.

(10) Patent No.: US 11,850,941 B2
(45) Date of Patent: Dec. 26, 2023

(54) DISPLAY CONTROL APPARATUS, DISPLAY APPARATUS, DISPLAY SYSTEM, MOVING BODY, PROGRAM, AND IMAGE GENERATION METHOD

(71) Applicants: Yuuki Suzuki, Kanagawa (JP); Hiroshi Yamaguchi, Kanagawa (JP)

(72) Inventors: Yuuki Suzuki, Kanagawa (JP); Hiroshi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 105 days.

(21) Appl. No.: 17/428,992

(22) PCT Filed: Dec. 10, 2019

(86) PCT No.: PCT/JP2019/048345
§ 371 (c)(1),
(2) Date: Aug. 6, 2021

(87) PCT Pub. No.: WO2020/188910
PCT Pub. Date: Sep. 24, 2020

(65) Prior Publication Data
US 2022/0024316 A1    Jan. 27, 2022

(30) Foreign Application Priority Data
Mar. 20, 2019  (JP) .................................. 2019-053391

(51) Int. Cl.
*B60K 37/02*  (2006.01)
(52) U.S. Cl.
CPC ...... *B60K 37/02* (2013.01); *B60K 2370/1529* (2019.05); *B60K 2370/178* (2019.05);
(Continued)

(58) Field of Classification Search
CPC ............ B60K 37/02; B60K 2370/1529; B60K 2370/178; B60K 2370/1868;
(Continued)

(56) References Cited

U.S. PATENT DOCUMENTS

| 8,384,953 B2 | 2/2013 | Yamaguchi |
| 9,041,944 B2 | 5/2015 | Umezawa et al. |

(Continued)

FOREIGN PATENT DOCUMENTS

| JP | 2008-015758 A | 1/2008 |
| JP | 2016-062368 A | 4/2016 |

(Continued)

OTHER PUBLICATIONS

Japanese Office Action dated Aug. 30, 2022 in corresponding Japanese Patent Application No. 2019-053391, 2 pages.

(Continued)

*Primary Examiner* — Christopher E Leiby
(74) *Attorney, Agent, or Firm* — XSENSUS LLP

(57) ABSTRACT

The display control apparatus for presenting information on a display unit presenting a virtual image in front of a moving body through a transparent member includes an information acquiring unit configured to acquire information about an obstacle around the moving body, a display image generation unit configured to generate, based on the information about the obstacle acquired by the information acquiring unit, data of an indicator image which points in a direction of the obstacle in the virtual image and which moves in the direction of the obstacle to approach the obstacle, and an output unit configured to output the indicator image generated by the display image generation unit to the display unit.

19 Claims, 33 Drawing Sheets

(52) U.S. Cl.
CPC ............ *B60K 2370/1868* (2019.05); *B60K 2370/193* (2019.05); *B60Y 2300/08* (2013.01)

(58) Field of Classification Search
CPC ........ B60K 2370/193; B60K 2370/179; B60K 35/00; B60Y 2300/08; B60R 2300/205; B60R 2300/70; B60R 2300/8093; B60R 1/00; G02B 2027/0138; G02B 2027/0141; G02B 27/0101; G08G 1/166; G09G 2340/145; G09G 3/002; G09G 5/14; G09G 2380/10

See application file for complete search history.

(56) References Cited

U.S. PATENT DOCUMENTS

| | | | |
|---|---|---|---|
| 9,514,718 | B2 | 12/2016 | Itoh et al. |
| 9,544,453 | B2 | 1/2017 | Umezawa et al. |
| 9,761,145 | B2 | 9/2017 | Ejiri |
| 9,921,460 | B2 | 3/2018 | Yamaguchi et al. |
| 10,156,728 | B2 | 12/2018 | Saisho et al. |
| 10,162,651 | B1 * | 12/2018 | Zhu .................. G06F 9/453 |
| 10,241,565 | B2 | 3/2019 | Yamaguchi et al. |
| 10,549,638 | B2 | 2/2020 | Suzuki et al. |
| 10,621,776 | B2 * | 4/2020 | Katagiri .............. G09G 5/00 |
| 10,679,496 | B2 | 6/2020 | Yamaguchi et al. |
| 10,696,159 | B2 | 6/2020 | Saisho et al. |
| 10,890,762 | B2 | 1/2021 | Kusanagi et al. |
| 10,923,076 | B2 | 2/2021 | Suzuki et al. |
| 2013/0163019 | A1 | 6/2013 | Tago et al. |
| 2017/0101056 | A1 * | 4/2017 | Park ...................... G08G 1/04 |
| 2017/0225617 | A1 * | 8/2017 | Morimura ............ G06V 40/10 |
| 2017/0336222 | A1 | 11/2017 | Yamaguchi et al. |
| 2017/0336629 | A1 * | 11/2017 | Suzuki ................ G05D 1/0253 |
| 2018/0170257 | A1 * | 6/2018 | Ohta ...................... B60Q 9/008 |
| 2018/0174463 | A1 * | 6/2018 | Ohta ...................... B60W 30/08 |
| 2018/0180879 | A1 | 6/2018 | Yamaguchi et al. |
| 2018/0180880 | A1 * | 6/2018 | Katagiri ............ G02B 27/0101 |
| 2018/0218711 | A1 | 8/2018 | Suzuki et al. |
| 2018/0218713 | A1 * | 8/2018 | Kusanagi ................ G06T 11/60 |
| 2018/0297520 | A1 * | 10/2018 | Morimura .............. G02B 27/01 |
| 2018/0321491 | A1 * | 11/2018 | Kuo ...................... B60R 1/001 |
| 2018/0339591 | A1 | 11/2018 | Suzuki et al. |
| 2020/0142190 | A1 * | 5/2020 | Suzuki ............... G02B 27/0101 |
| 2020/0183157 | A1 | 6/2020 | Suzuki et al. |
| 2021/0094418 | A1 * | 4/2021 | Liang .................... B60R 11/00 |

FOREIGN PATENT DOCUMENTS

| | | |
|---|---|---|
| JP | 2017-138796 A | 8/2017 |
| JP | 2017-174358 A | 9/2017 |
| JP | 6303428 | 4/2018 |
| JP | 2018-106655 | 7/2018 |
| JP | 2018-180908 A | 11/2018 |
| WO | 2018-124100 | 7/2018 |

OTHER PUBLICATIONS

International Search Report for PCT/JP2019/048345 dated Feb. 21, 2020, 13 pages.

* cited by examiner

[Fig. 1A]
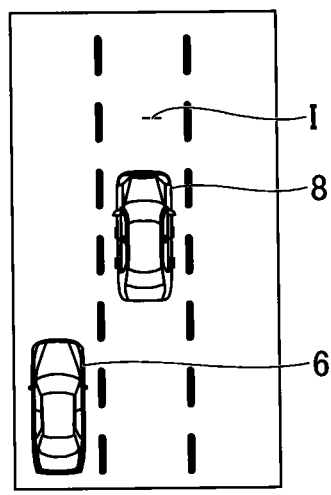
[Fig. 1B]
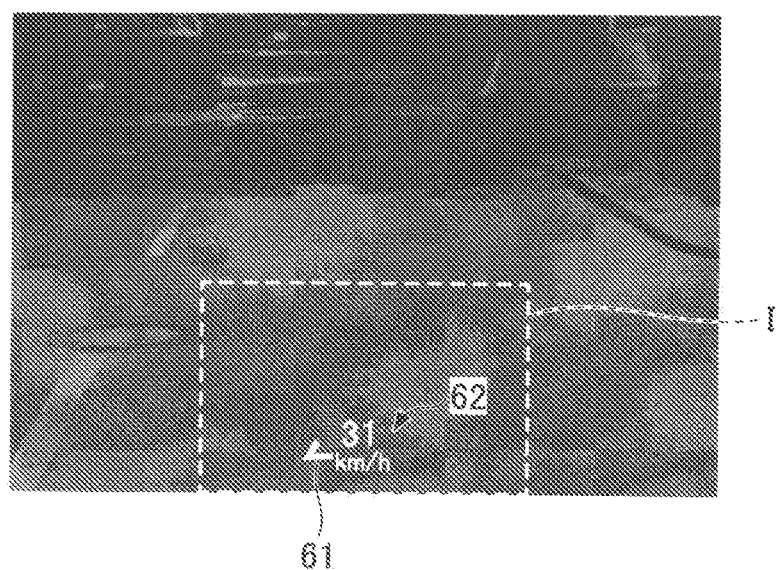

[Fig. 1C]
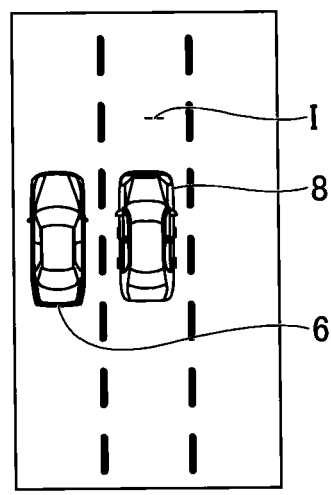
[Fig. 1D]
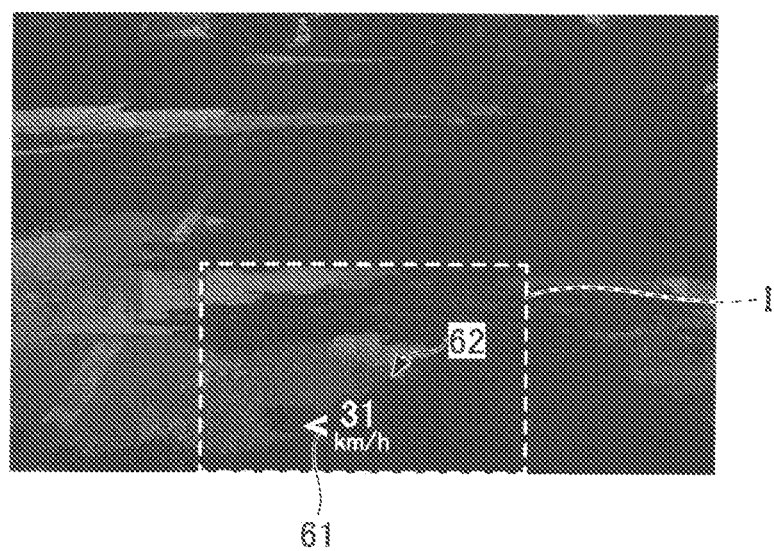

[Fig. 1E]
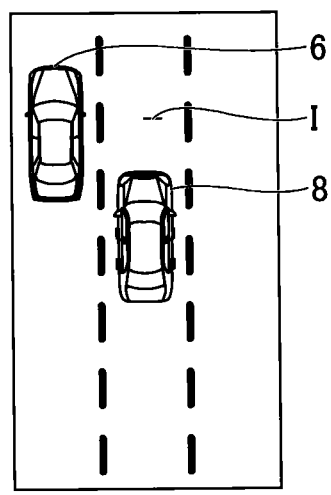
[Fig. 1F]
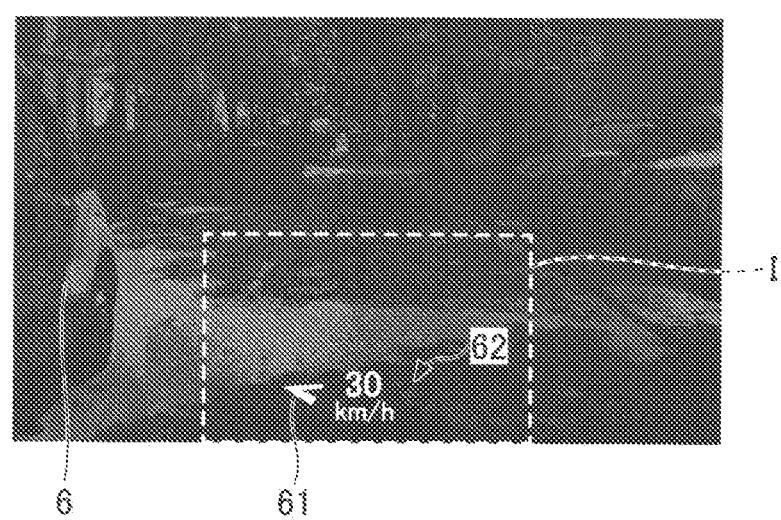

[Fig. 2]
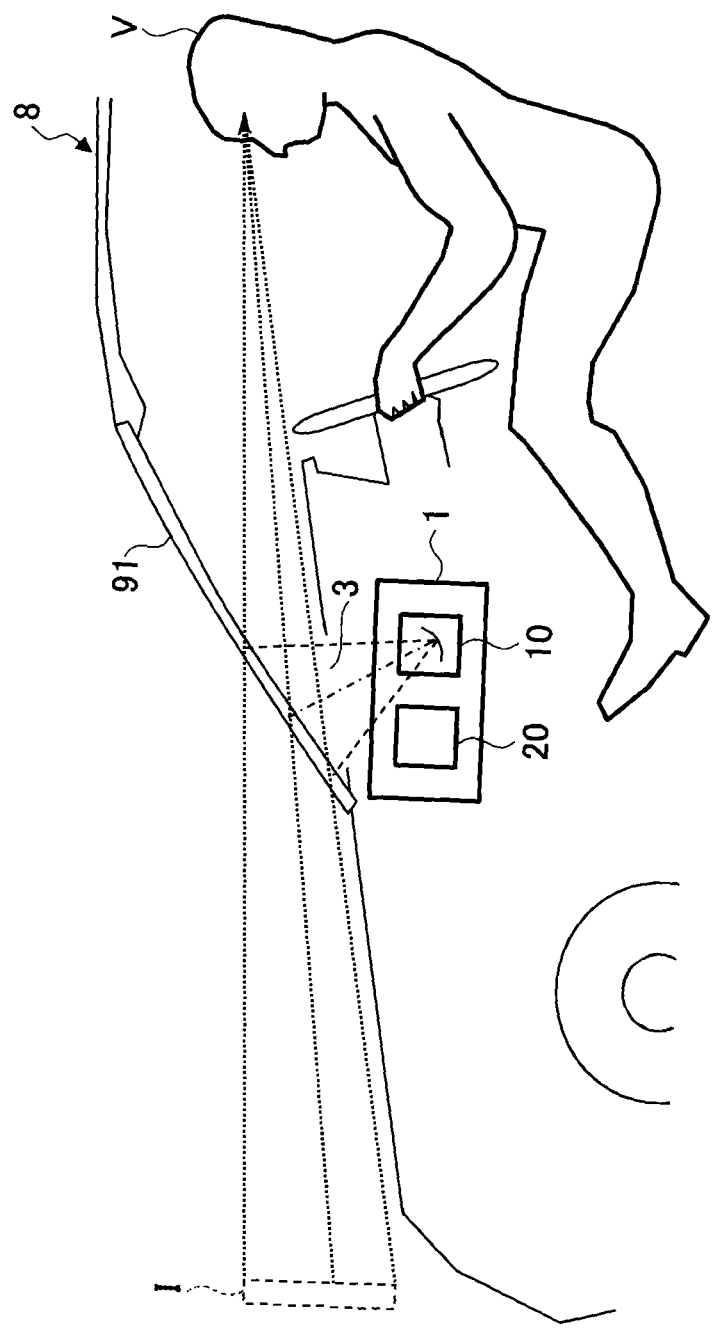

[Fig. 3]
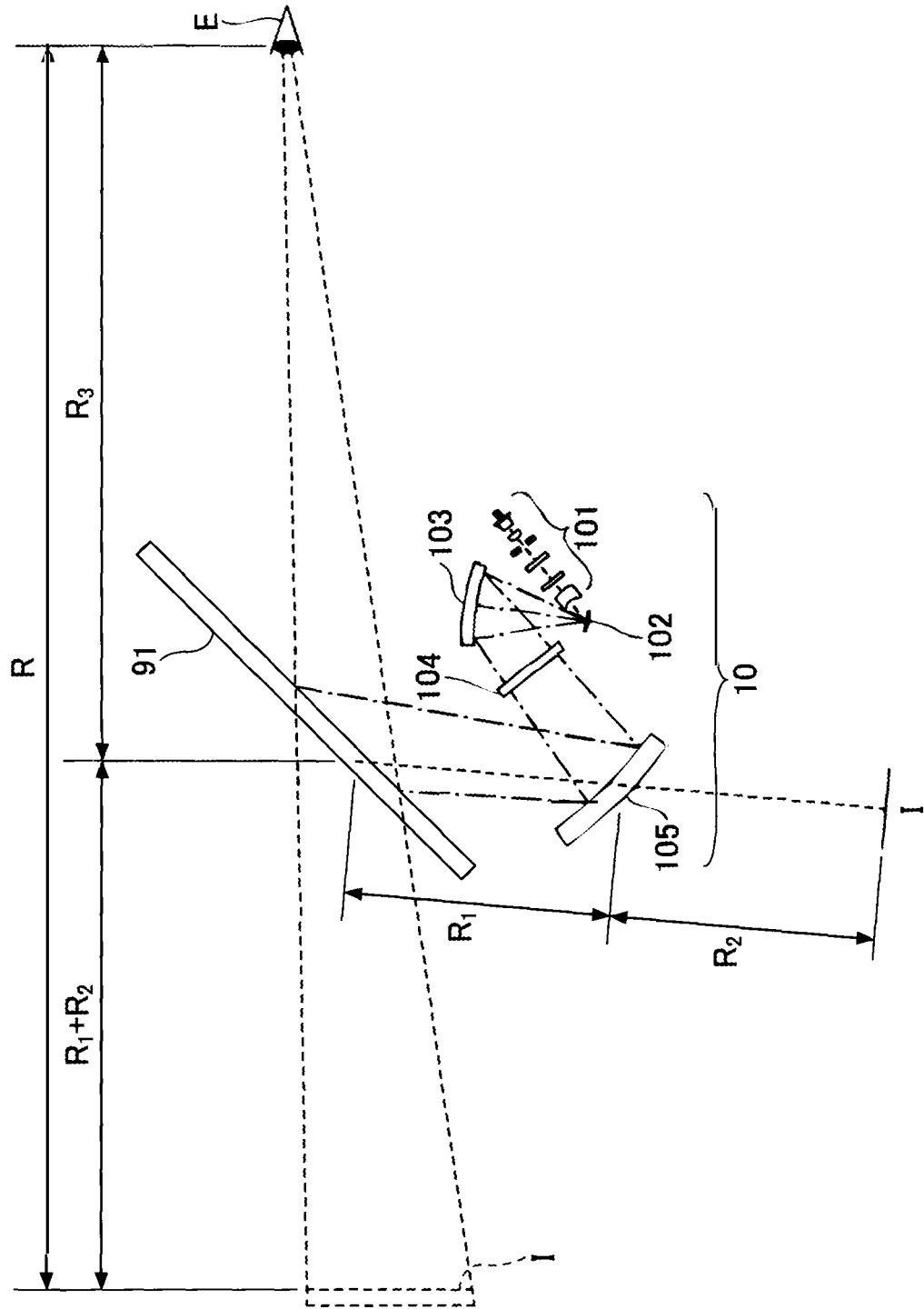

[Fig. 4]
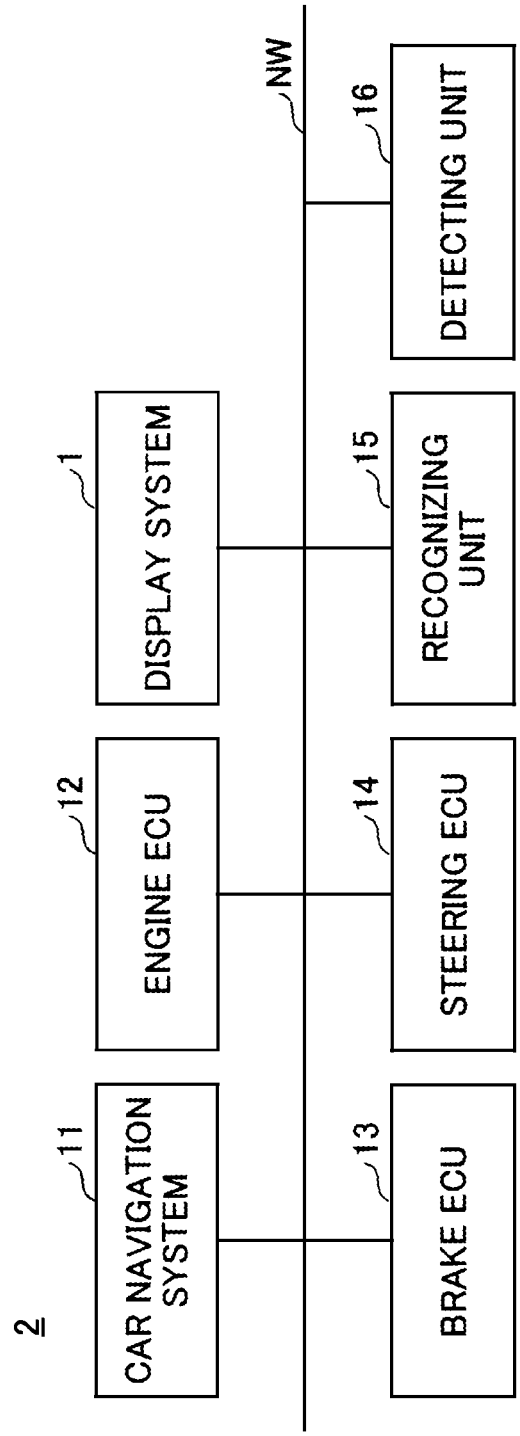

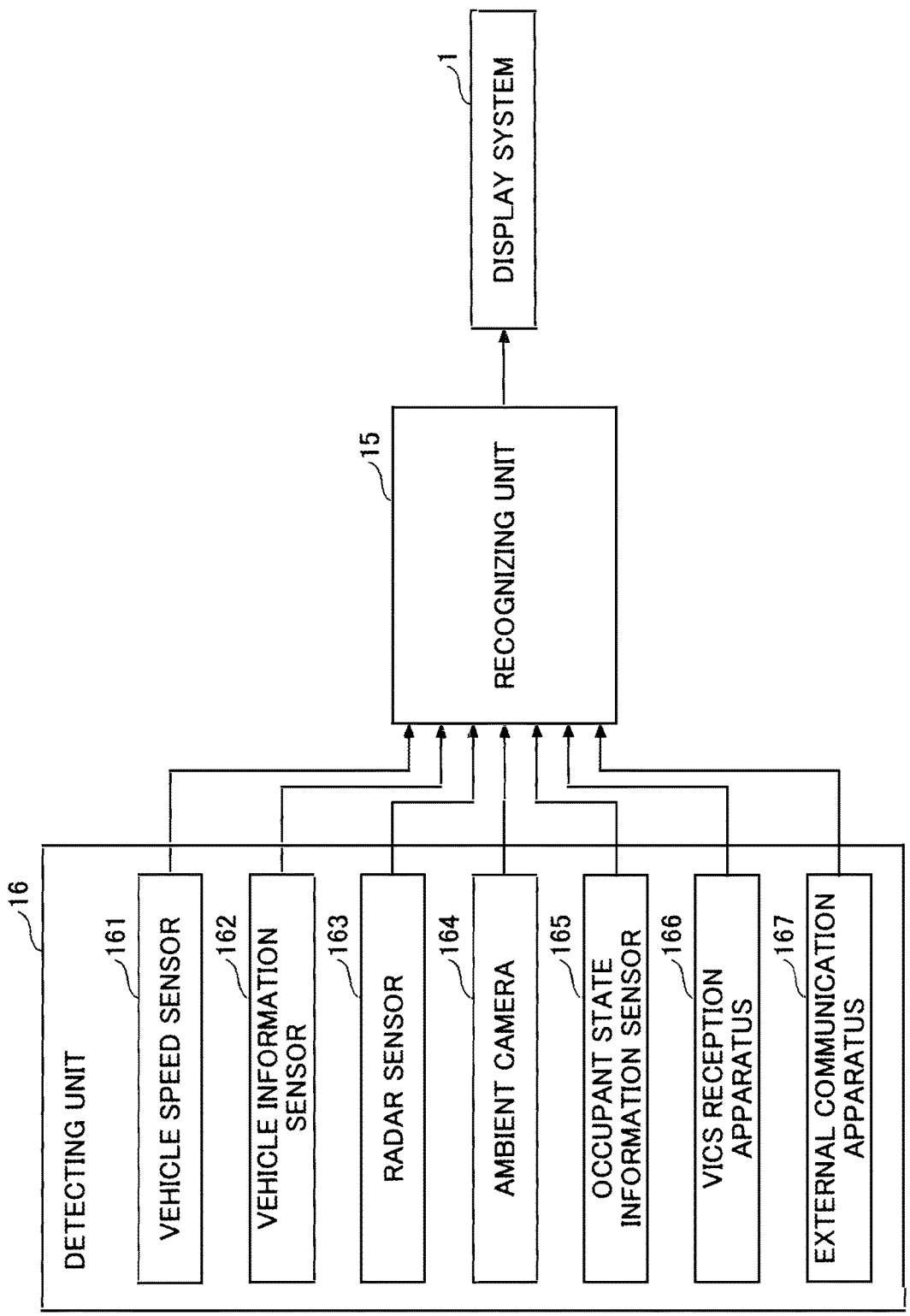

[Fig. 6]
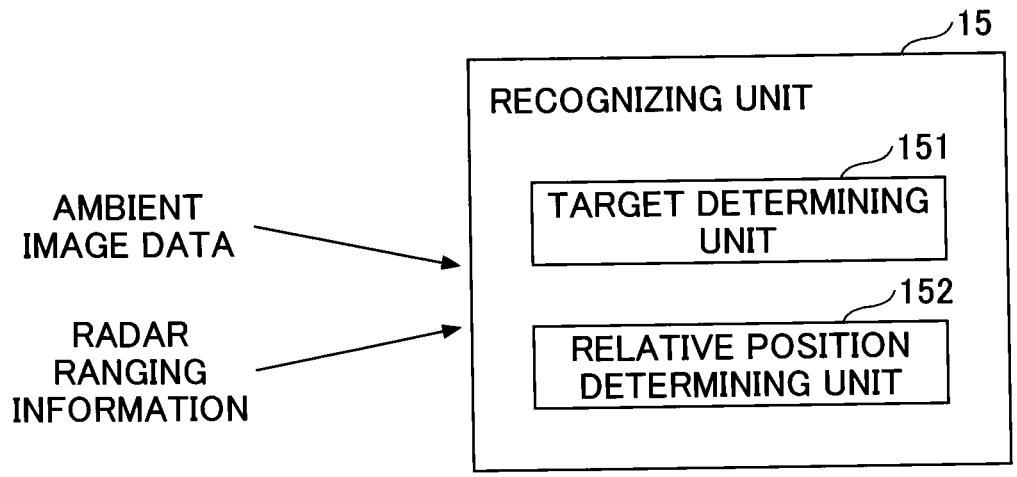
[Fig. 7]
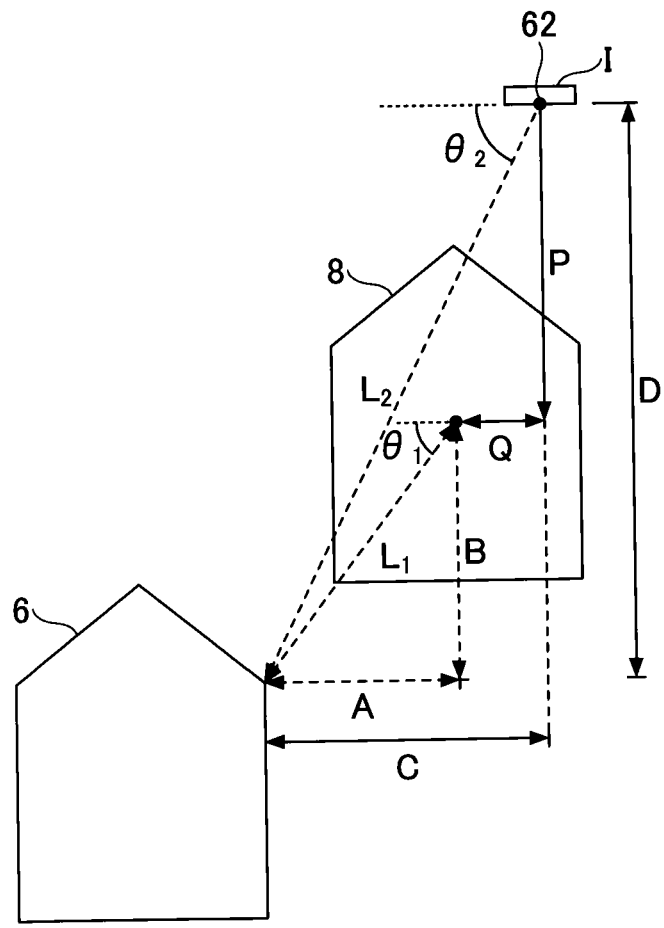

[Fig. 8]
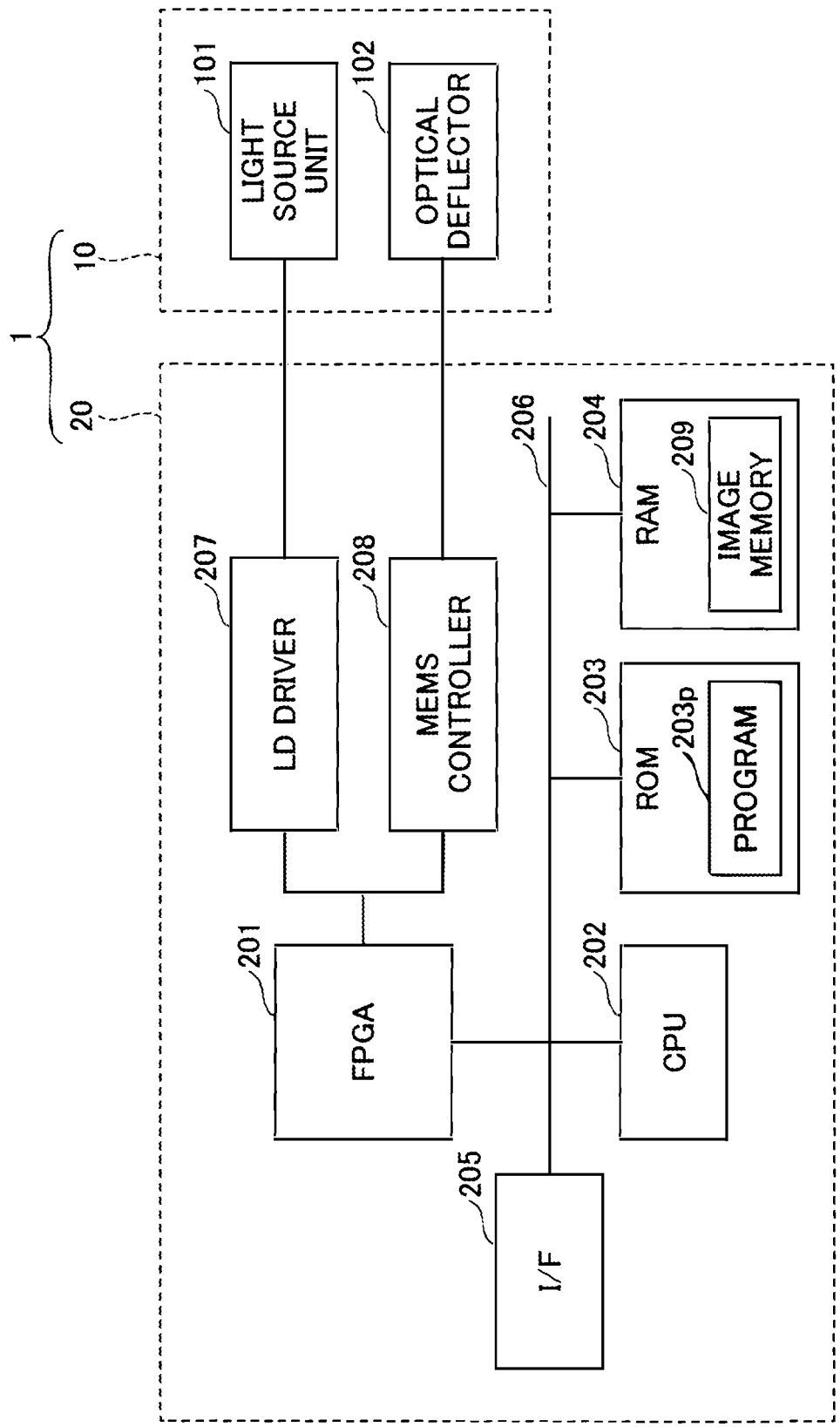

[Fig. 9]
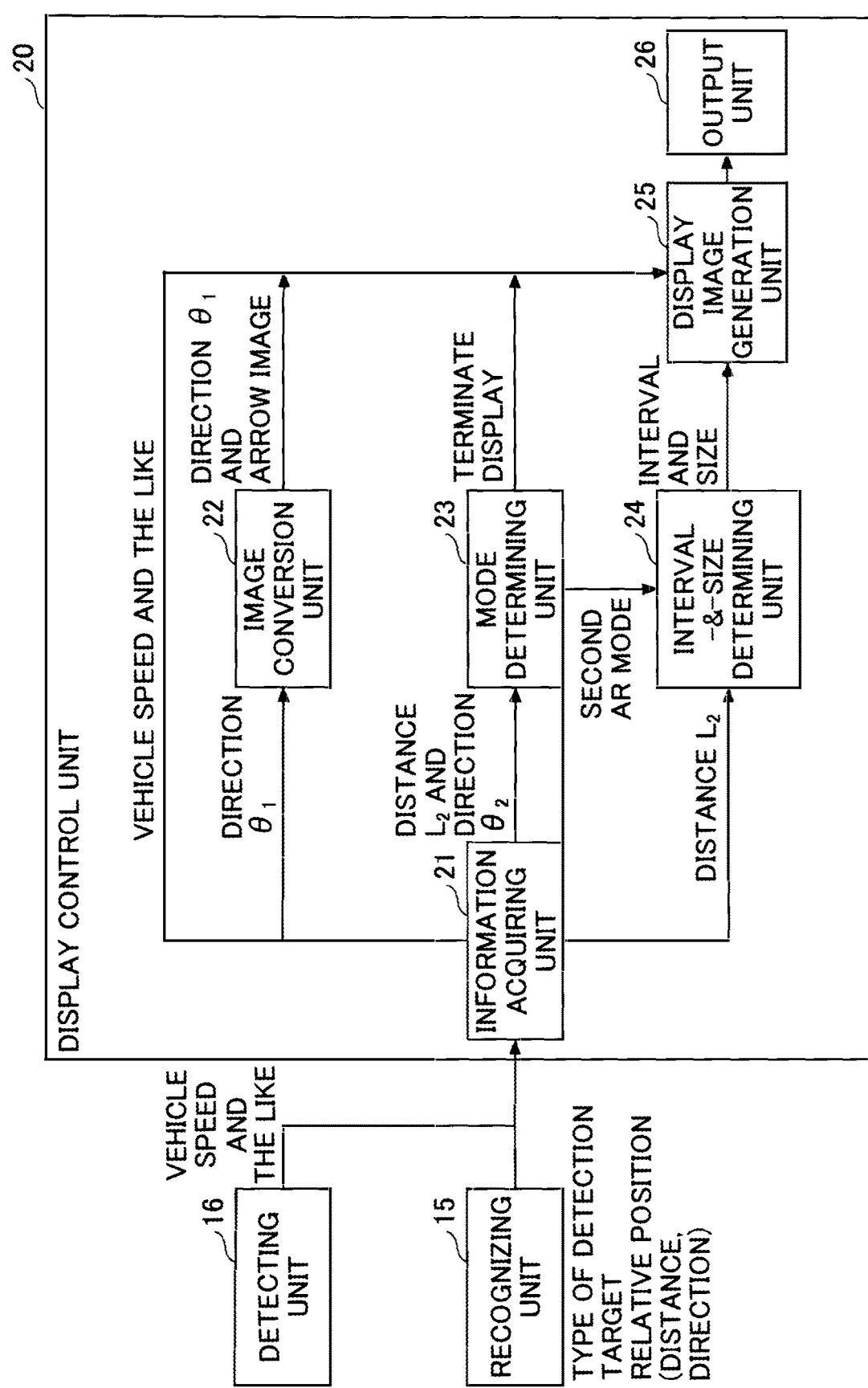

[Fig. 10A]
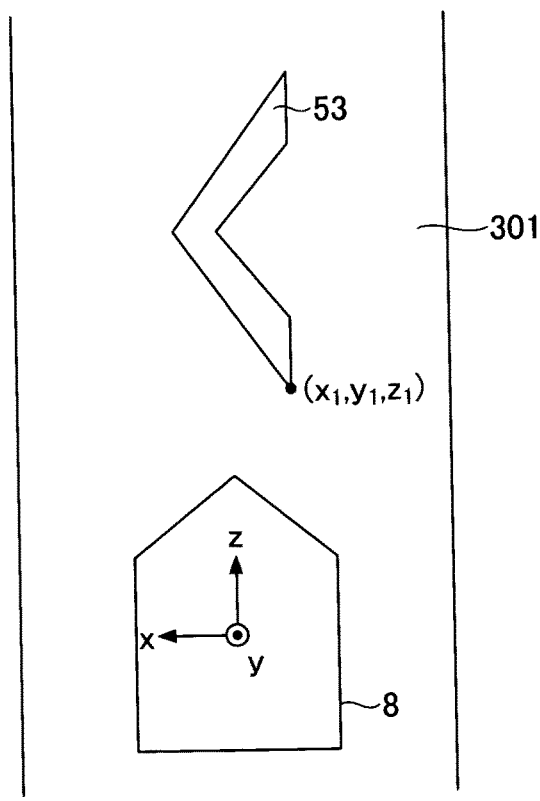
[Fig. 10B]
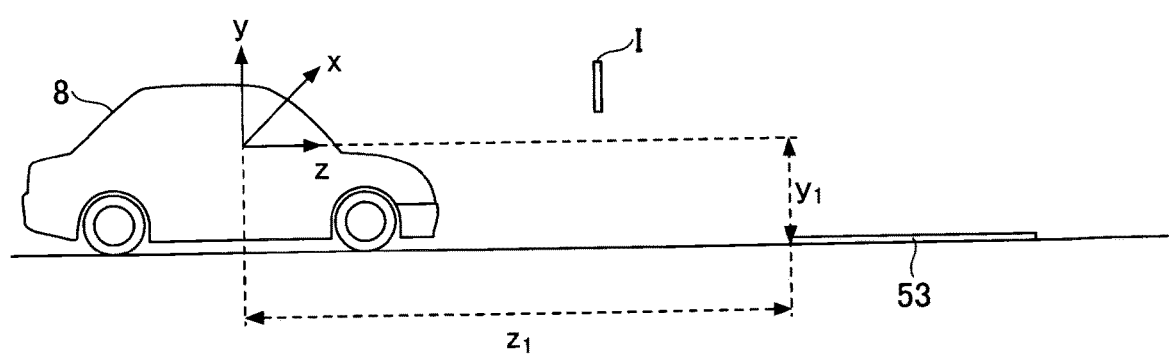

[Fig. 11]
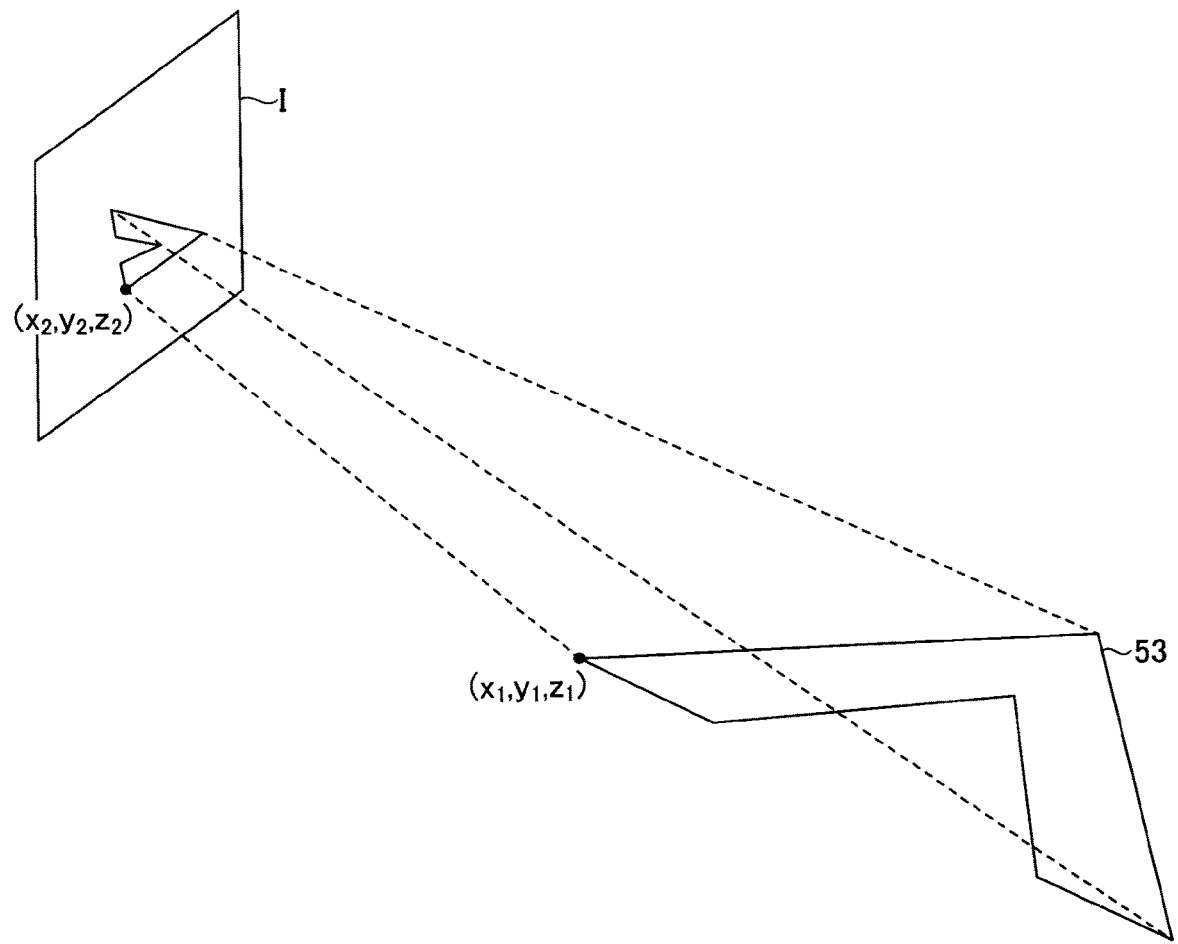

[Fig. 12A]
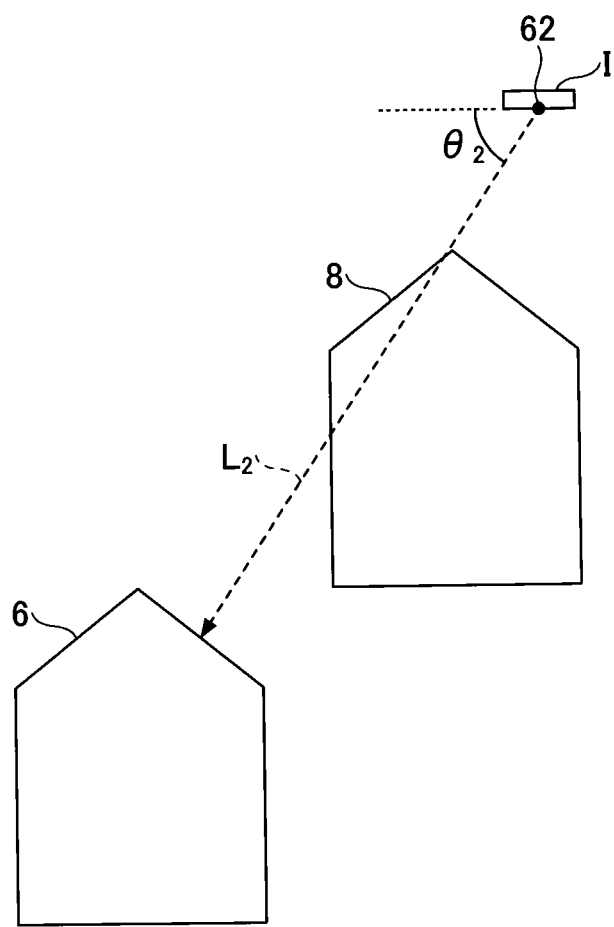

[Fig. 12B]
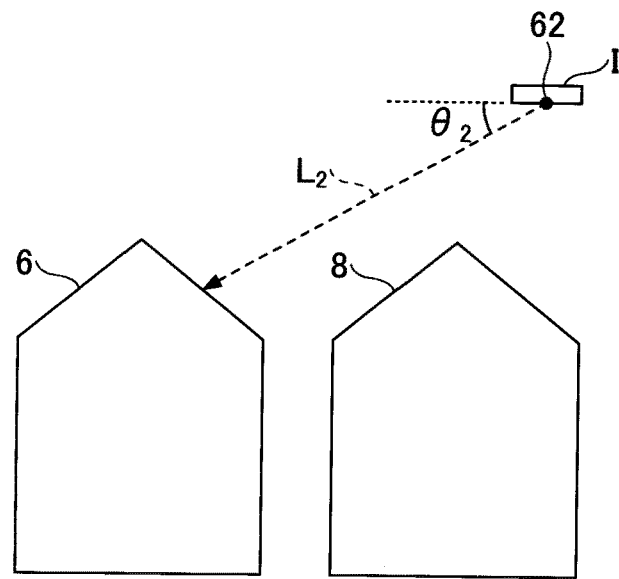
[Fig. 13]
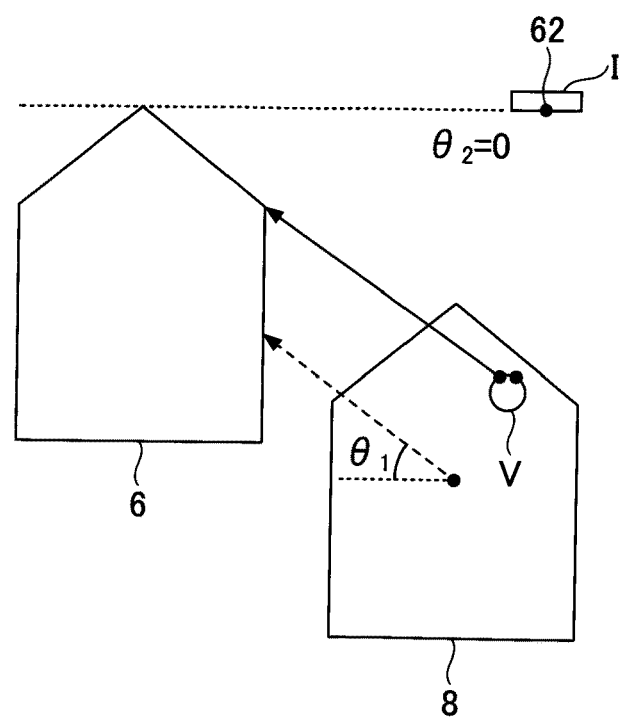

[Fig. 14A]
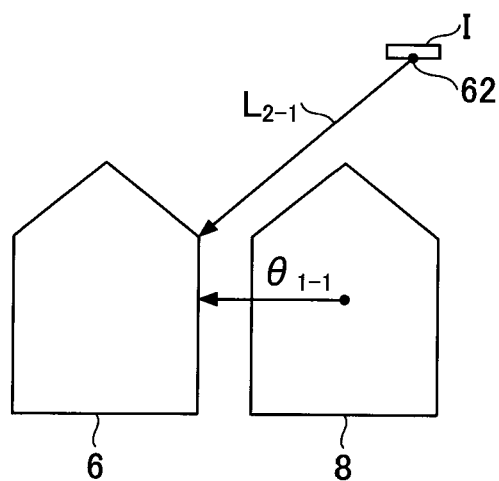
[Fig. 14B]
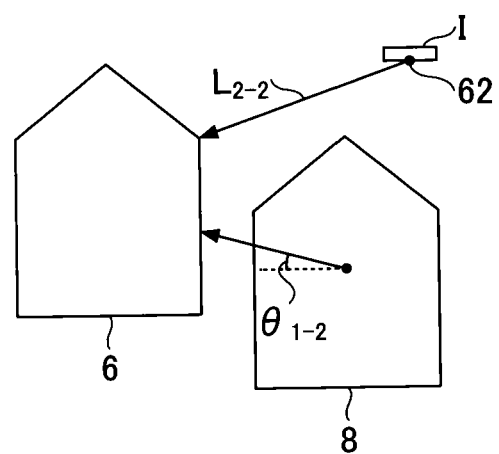

[Fig. 14C]
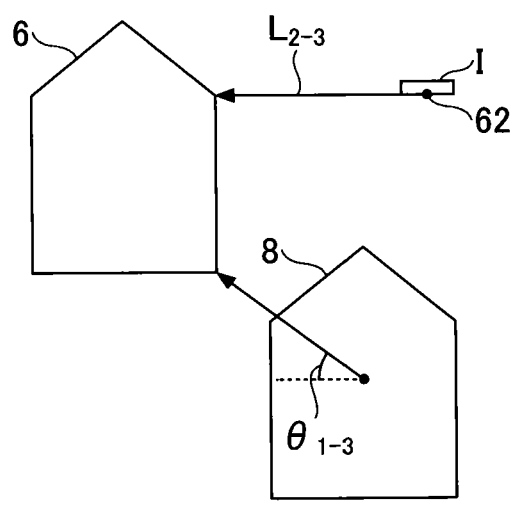
[Fig. 14D]
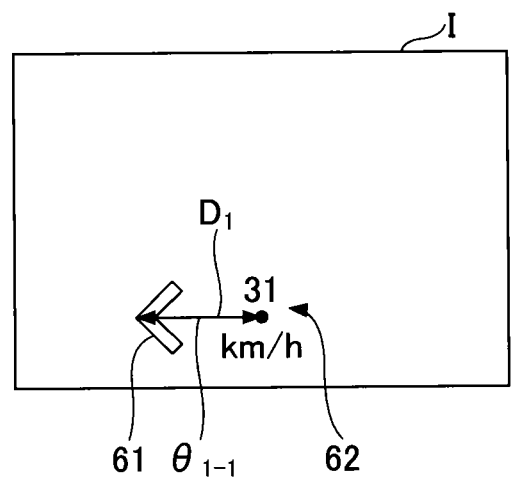

[Fig. 14E]
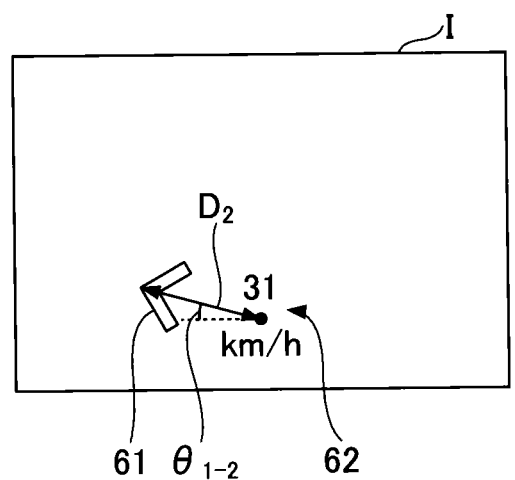
[Fig. 14F]
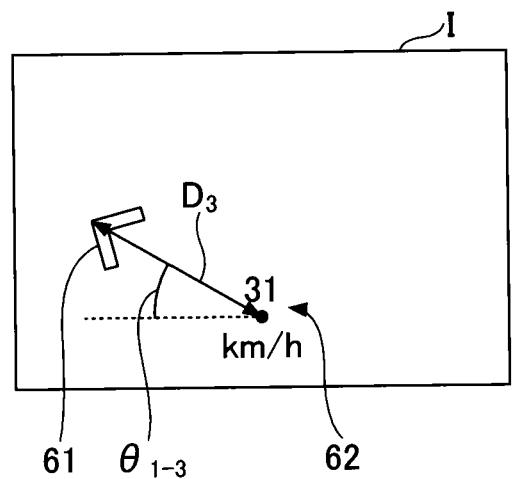

[Fig. 15A]
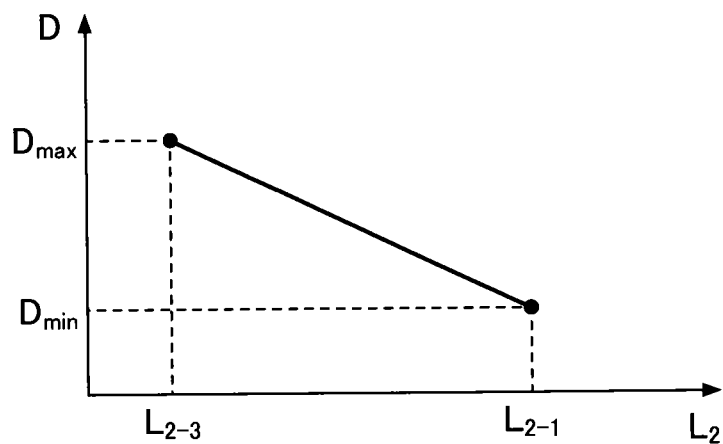
[Fig. 15B]
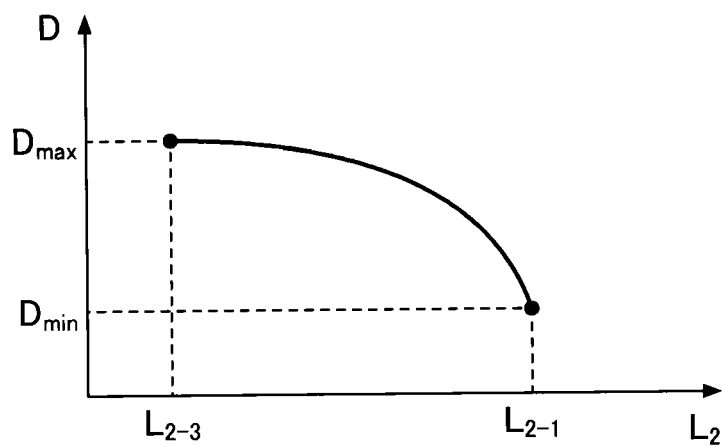

[Fig. 15C]
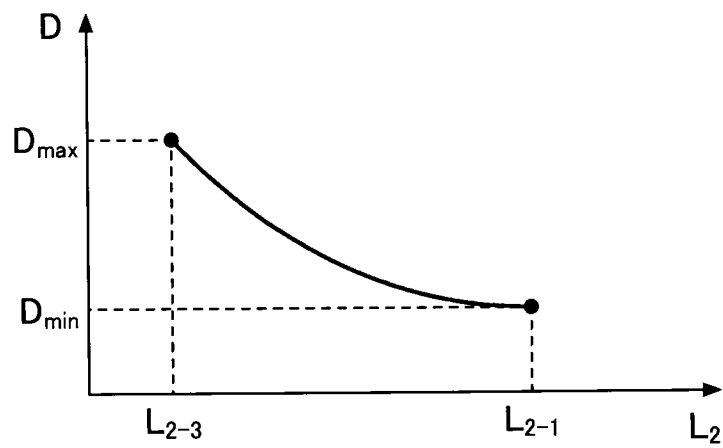
[Fig. 16A]
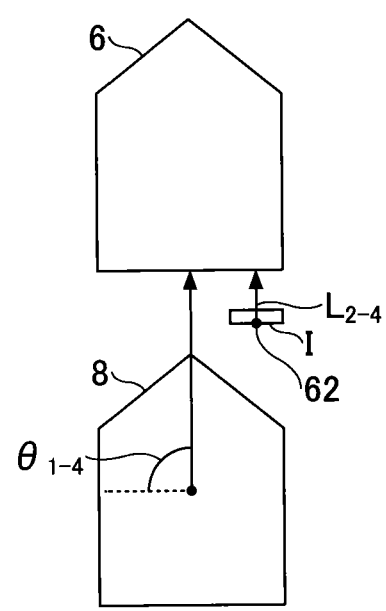

[Fig. 16B]
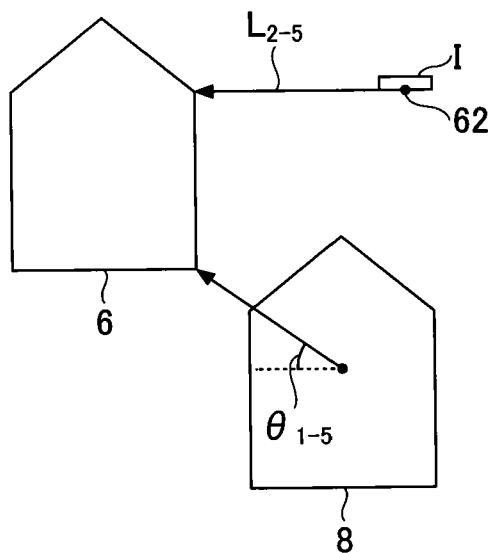
[Fig. 16C]
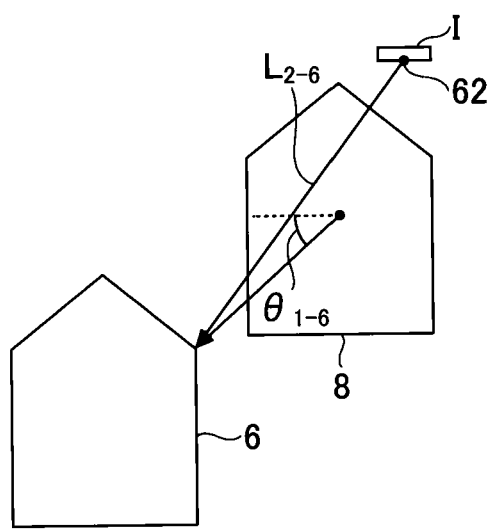

[Fig. 16D]
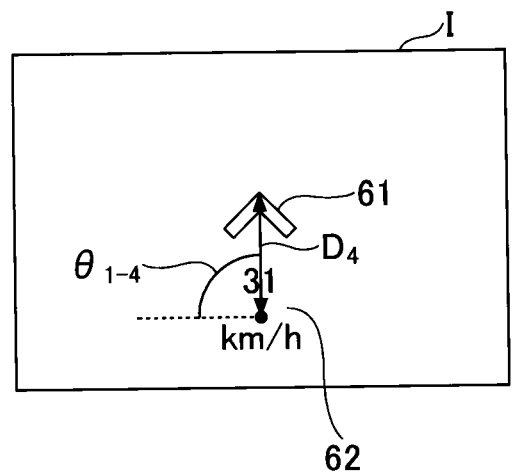
[Fig. 16E]
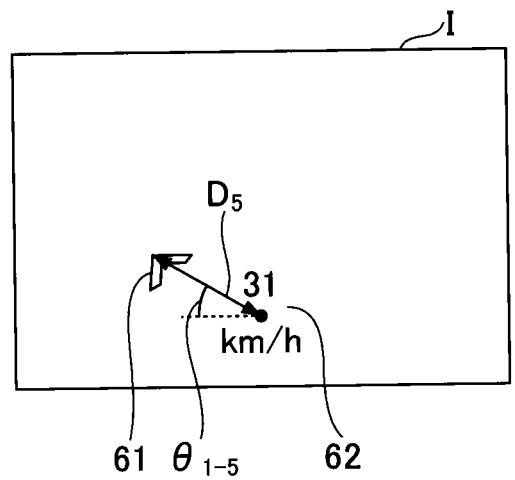

[Fig. 16F]
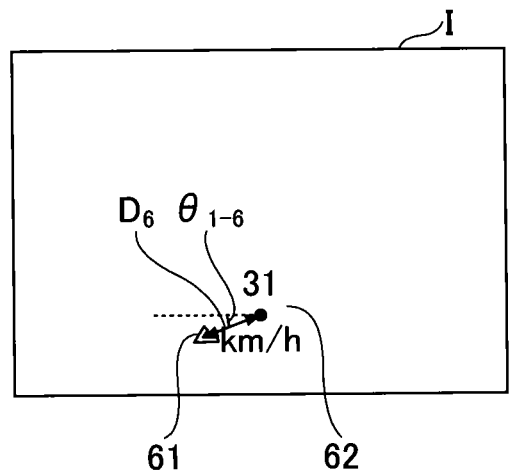
[Fig. 17]
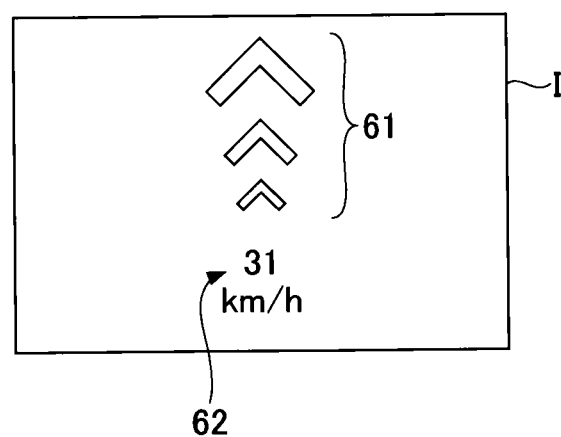

[Fig. 18]
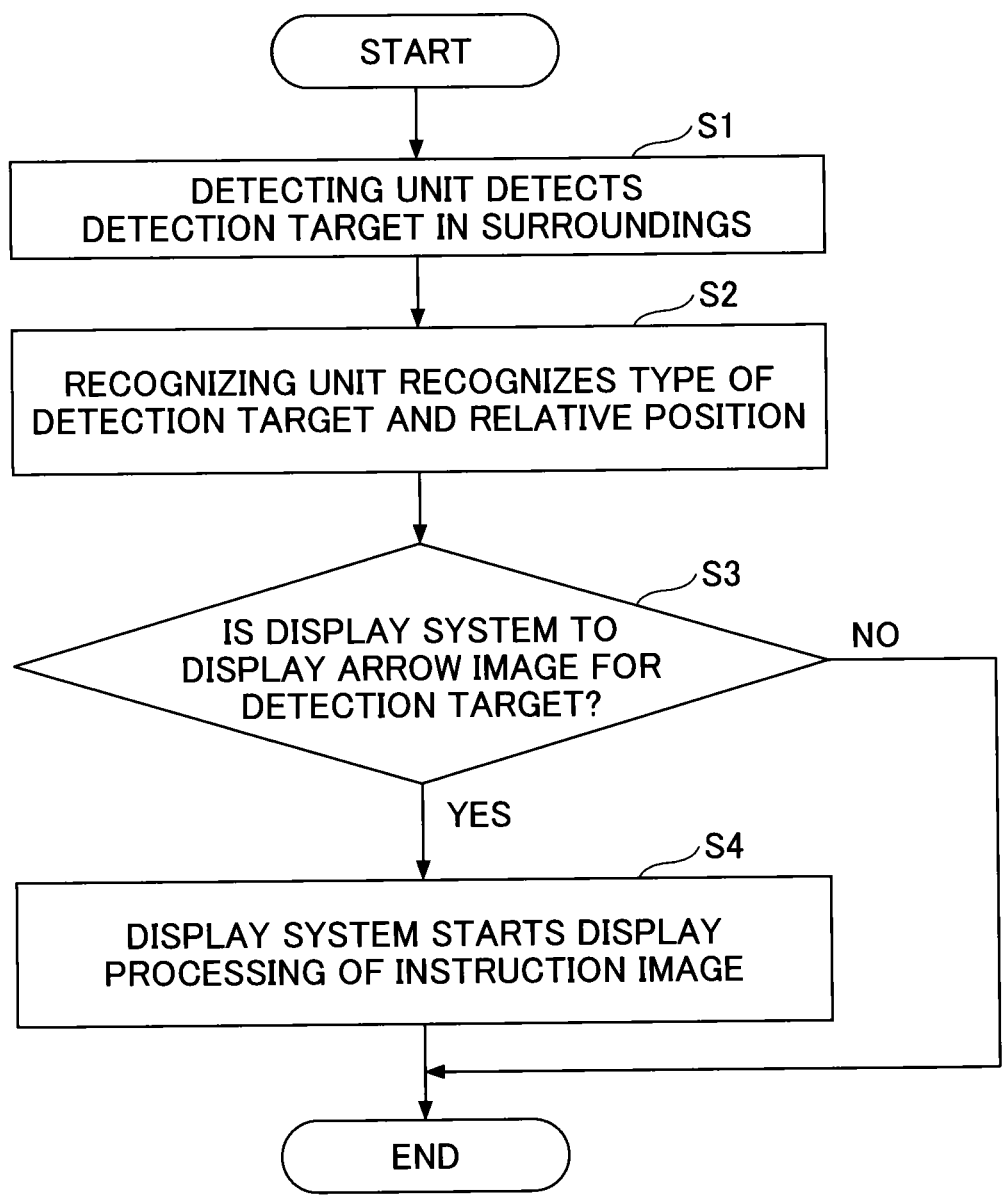

[Fig. 19]
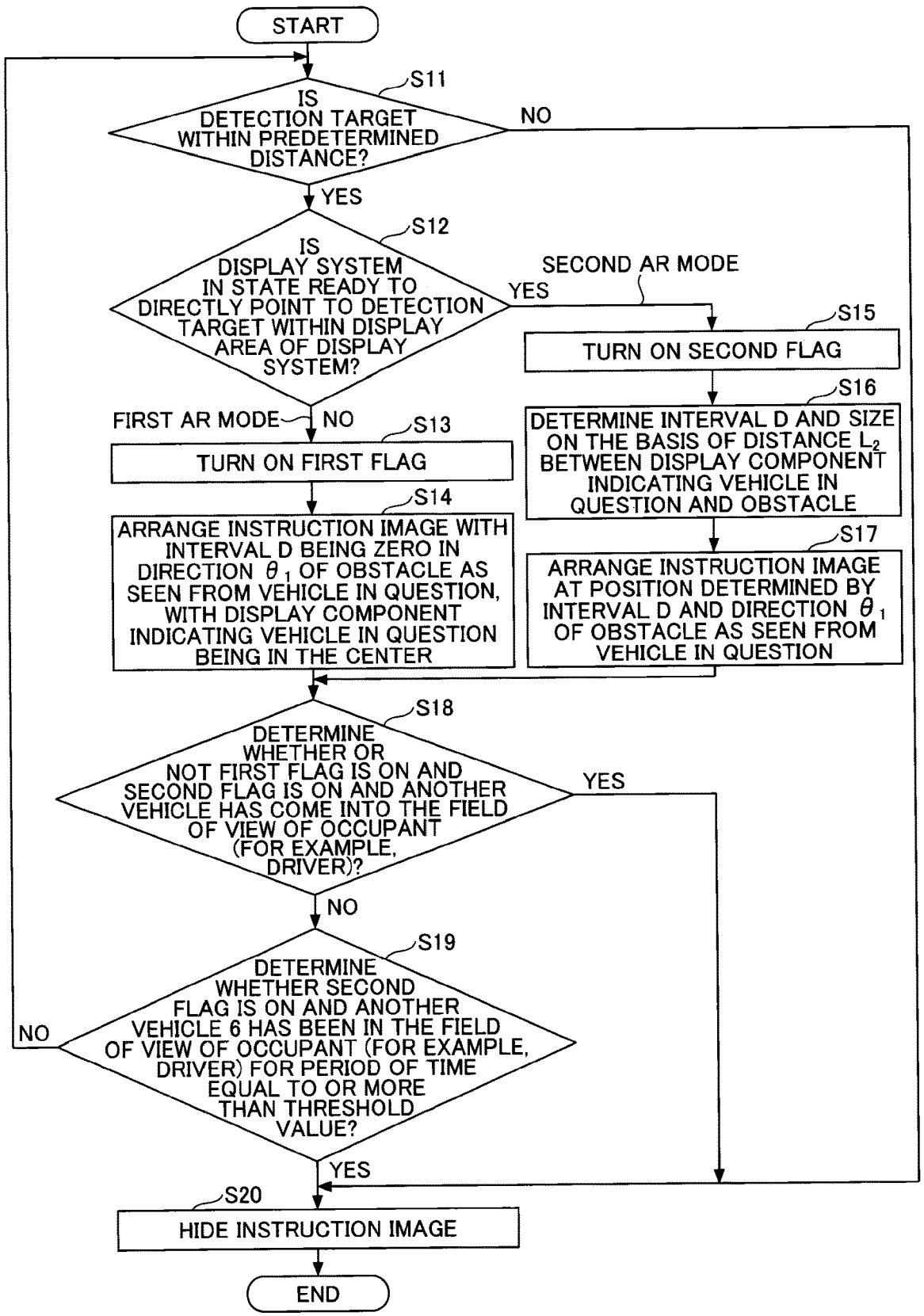

[Fig. 20A]
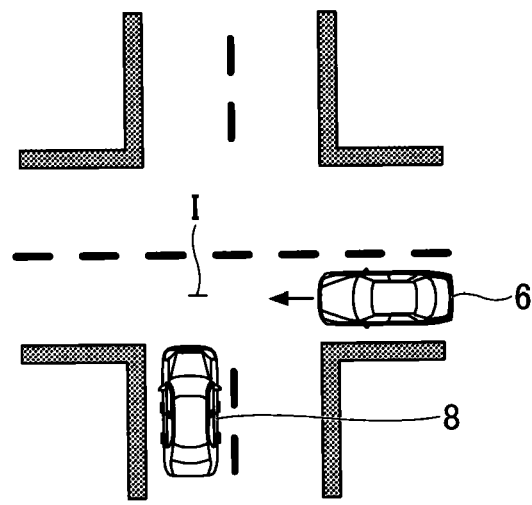
[Fig. 20B]
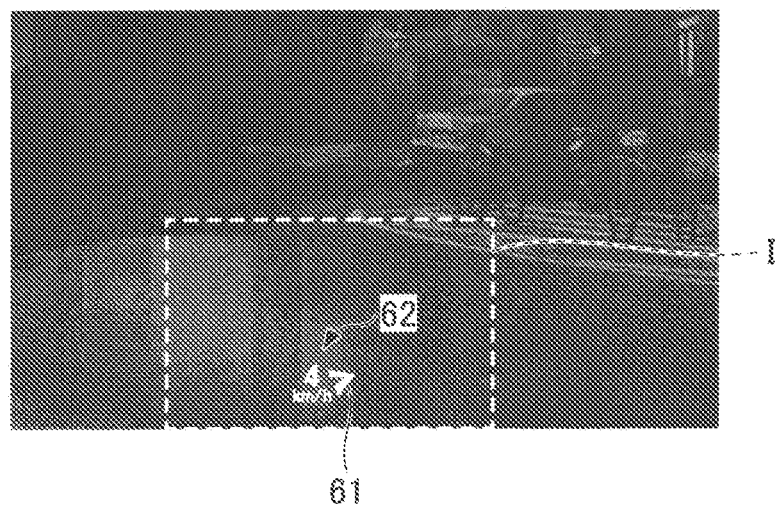

[Fig. 20C]
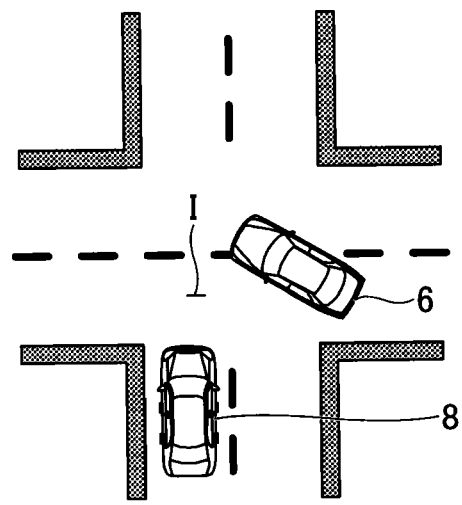
[Fig. 20D]
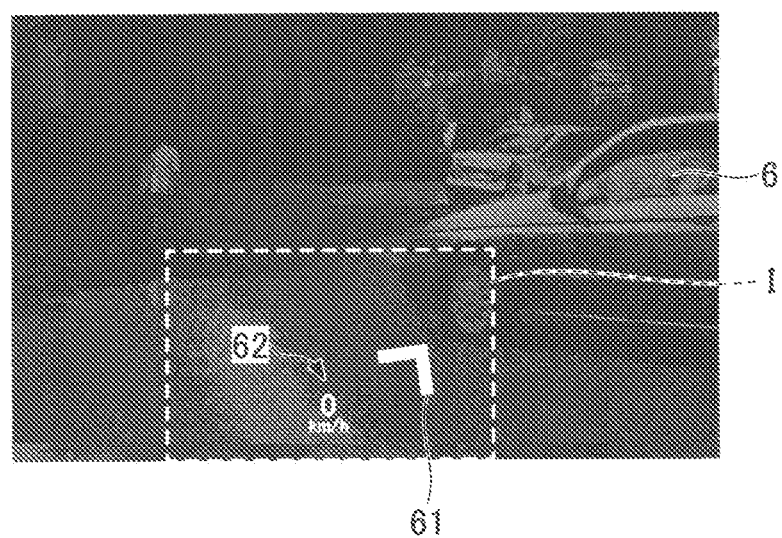

[Fig. 20E]
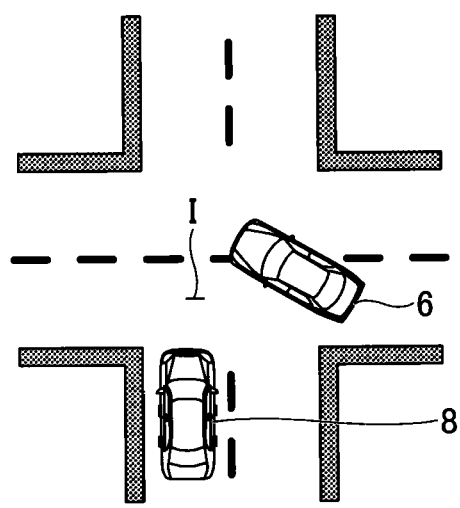
[Fig. 20F]
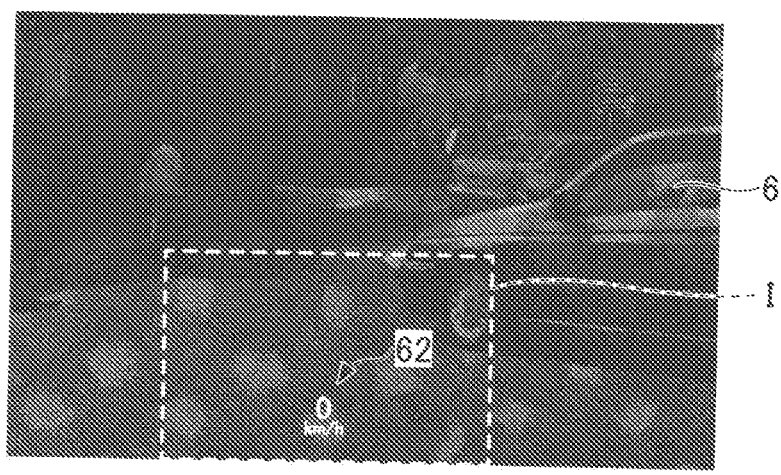

[Fig. 21A]
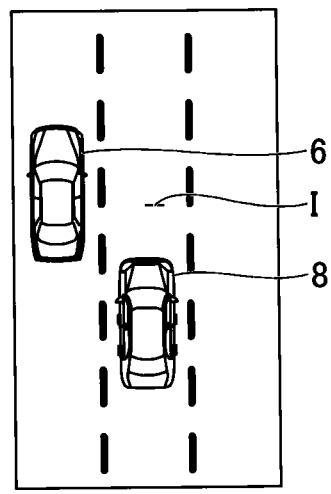
[Fig. 21B]
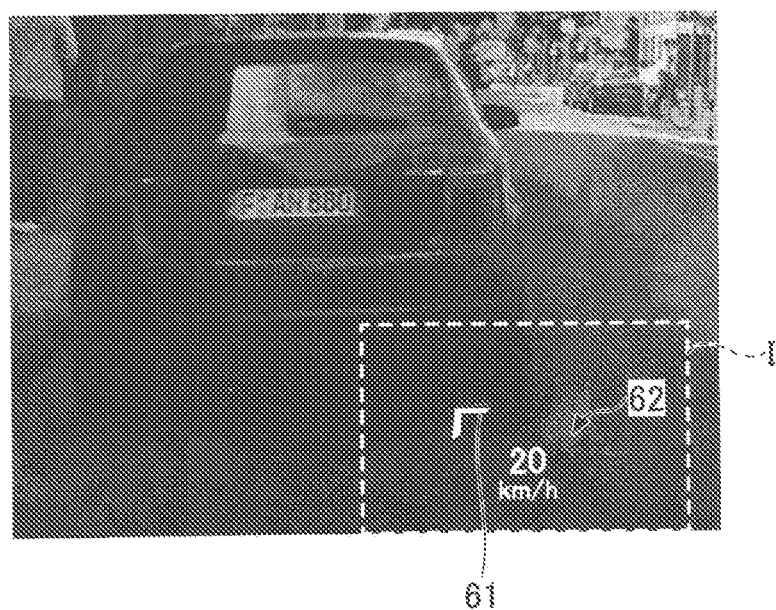

[Fig. 22A]
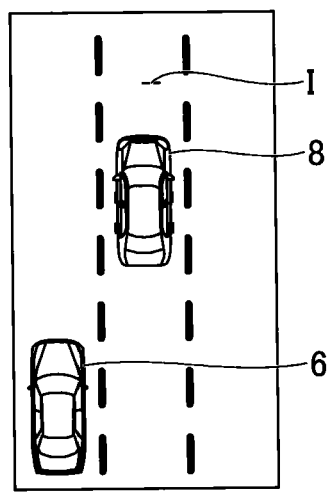
[Fig. 22B]
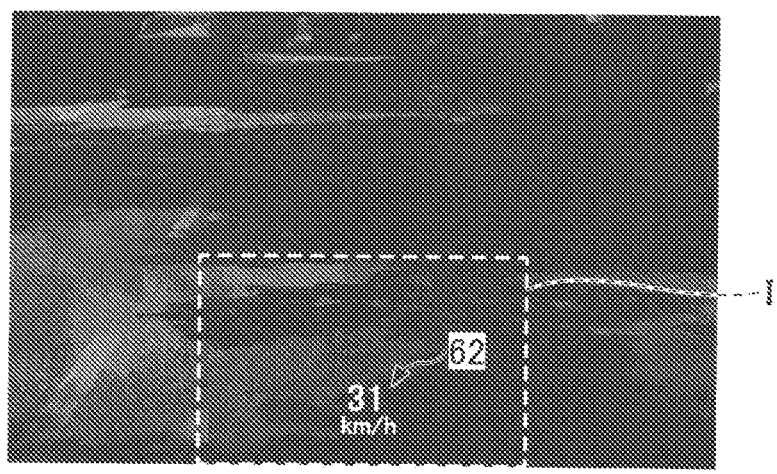

[Fig. 22C]
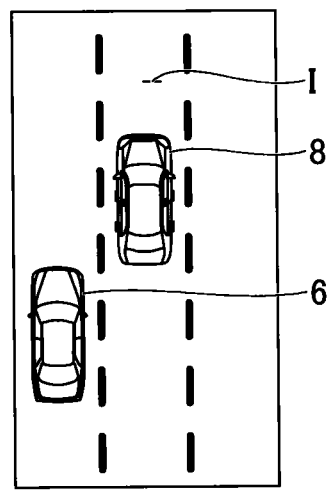
[Fig. 22D]
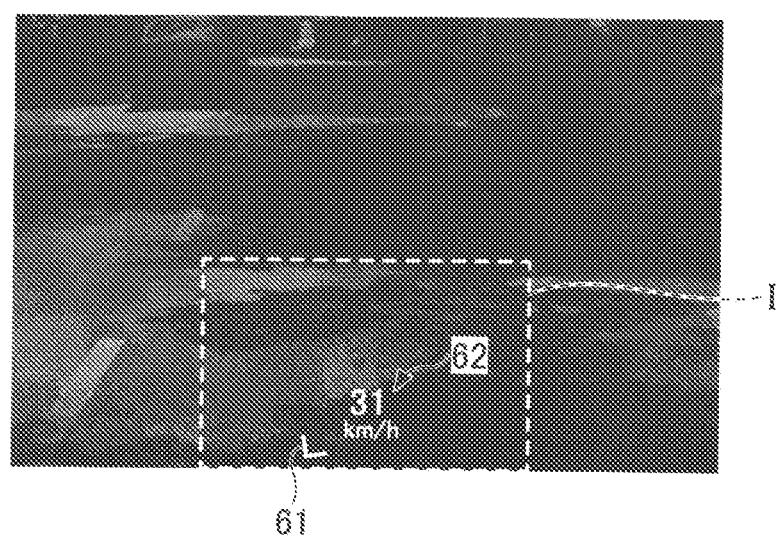

[Fig. 22E]
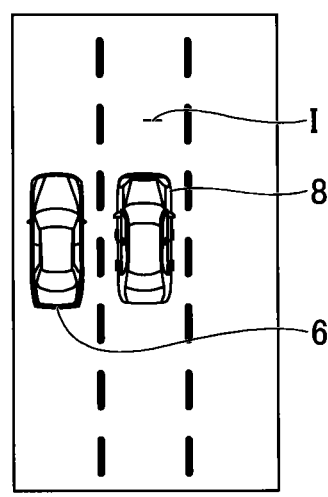
[Fig. 22F]
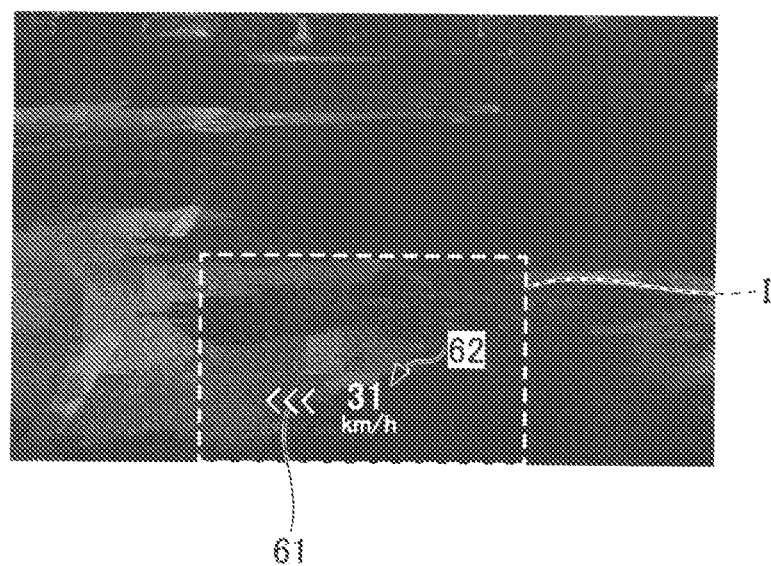

[Fig. 23A]
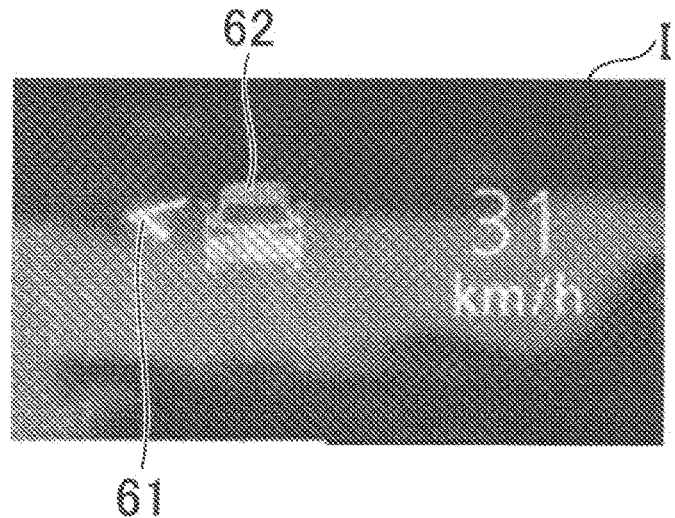
[Fig. 23B]
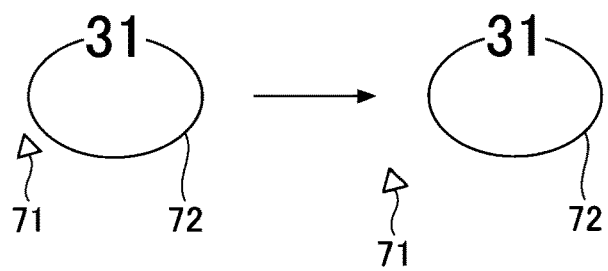
[Fig. 23C]
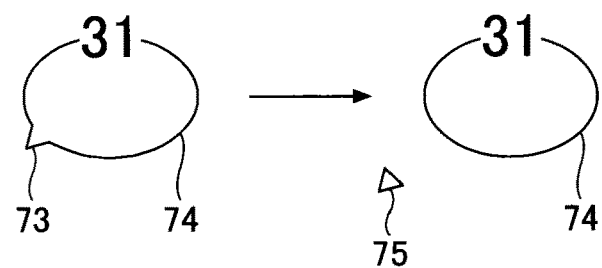

[Fig. 23D]
[Fig. 23E]
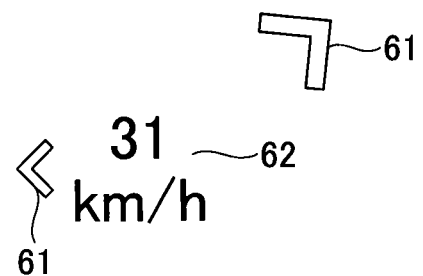

DISPLAY CONTROL APPARATUS, DISPLAY APPARATUS, DISPLAY SYSTEM, MOVING BODY, PROGRAM, AND IMAGE GENERATION METHOD

CROSS-REFERENCE TO RELATED APPLICATIONS

The present application is based on PCT filing PCT/JP2019/048345, filed Dec. 10, 2019, which claims priority to JP 2019-053391, filed Mar. 20, 2019, the entire contents of each are incorporated herein by reference.

TECHNICAL FIELD

The present invention relates to a display control apparatus, a display apparatus, a display system, a moving body, a program, and an image generation method.

BACKGROUND ART

A display system equipped with a head-up display (HUD) is known. The HUD presents various types of information as virtual images in front of an occupant such as a driver so that the occupant can check information with less eye movement. Also, advanced driver-assistance systems (ADAS) are becoming increasingly popular. With the ADAS, vehicles use various sensors to find the situation of the surroundings and display information about obstacles to the occupants to give warnings and control the vehicle.

When a display system displays, for example, an icon indicating that another vehicle has been detected behind the vehicle equipped with the display system, the occupant can find that the another vehicle is approaching from behind with less eye movement. However, with only the icons displayed, it is difficult for the occupant to find the approaching direction of the obstacle.

In addition, a display system indicating a future position of another vehicle has been developed (see, for example, PTL 1). PTL 1 discloses a vehicle information projection system that displays, in an adjacent lane as seen from the occupant of the vehicle in question, a line segment extending in accordance with a relative speed of or a relative distance to the another vehicle behind the vehicle in question. This makes it easier for the occupant to find the approaching direction of the obstacle.

SUMMARY OF INVENTION

Technical Problem

However, it is difficult to implement the technique described in PTL 1 with a virtual image having a limited display area, and even if a line segment extending in the display area is displayed, the problem of the difficulty in finding the approaching direction of an obstacle cannot be solved.

In view of the above problems, it is an object of the present invention to provide a display control apparatus capable of presenting an approaching direction of an obstacle in surroundings with a limited display area.

Solution to Problem

In view of the above, according to an aspect of the present invention, a display control apparatus for presenting information on a display unit presenting a virtual image in front of a moving body through a transparent member includes an information acquiring unit configured to acquire information about an obstacle around the moving body, a display image generation unit configured to generate, based on the information about the obstacle acquired by the information acquiring unit, data of an indicator image which points in a direction of the obstacle in the virtual image and which moves to approach the obstacle in a direction of the obstacle, and an output unit configured to output the indicator image generated by the display image generation unit to the display unit.

Effects of the Invention

A display control apparatus capable of presenting an approaching direction of an obstacle in surroundings with a limited display area can be provided.

BRIEF DESCRIPTION OF DRAWINGS

FIG. 1A is a top view illustrating an example of a situation of a vehicle 8 equipped with a display system 1 according to the present embodiment and another vehicle 6, i.e., an obstacle;

FIG. 1B is a drawing illustrating an example of information displayed by the display system 1 according to a detection result of the obstacle in surroundings as illustrated in FIG. 1A;

FIG. 1C is a top view illustrating an example of a situation of the vehicle 8 and the obstacle;

FIG. 1D is a drawing illustrating an example of information displayed by the display system 1 according to a detection result of the obstacle in surroundings as illustrated in FIG. 1C;

FIG. 1E is a top view illustrating an example of a situation of the vehicle 8 and the obstacle;

FIG. 1F is a drawing illustrating an example of information displayed by the display system 1 according to a detection result of the obstacle in surroundings as illustrated in FIG. 1E;

FIG. 2 is an example of a drawing illustrating overview of a display system mounted on a vehicle;

FIG. 3 is an example of a drawing illustrating a configuration of a display unit;

FIG. 4 is an example of a configuration diagram illustrating an in-vehicle system in which the display system is mounted on a moving body;

FIG. 5 is a drawing illustrating a configuration example of a detecting unit of the in-vehicle system;

FIG. 6 is a drawing illustrating an example of a function of a recognizing unit;

FIG. 7 is a drawing for explaining an example of a relative position of an obstacle with respect to the vehicle 8 or a display element indicating the vehicle 8;

FIG. 8 is an example of a hardware configuration diagram of a display control unit;

FIG. 9 is an example of a functional block diagram illustrating, with blocks, the functions of the display control unit;

FIG. 10A is an example of a drawing for explaining a conversion of an indicator image 61;

FIG. 10B is an example of a drawing for explaining a conversion of the indicator image 61;

FIG. 11 is an example of a drawing for explaining a perspective projection position conversion of a pre-conversion image painted on a road surface into a projection surface;

FIG. 12A is a drawing illustrating an example of a determination method for determining a first AR mode and a second AR mode;

FIG. 12B is a drawing illustrating an example of a determination method for determining the first AR mode and the second AR mode;

FIG. 13 is an example of a drawing for explaining timing at which an indicator image is hidden;

FIG. 14A is a top view illustrating an example of a situation of the vehicle 8 and another vehicle 6;

FIG. 14B is a top view illustrating an example of a situation of the vehicle 8 and the another vehicle 6;

FIG. 14C is a top view illustrating an example of a situation of the vehicle 8 and the another vehicle 6;

FIG. 14D is an example of a drawing for explaining an interval between the display element 62 indicating the vehicle 8 and the indicator image 61 corresponding to the situation illustrated in FIG. 14A;

FIG. 14E is an example of a drawing for explaining an interval between the display element 62 and the indicator image 61 corresponding to the situation illustrated in FIG. 14B;

FIG. 14F is an example of a drawing for explaining an interval between the display element 62 and the indicator image 61 corresponding to the situation illustrated in FIG. 14C;

FIG. 15A is a drawing illustrating an example of correspondence between a distance and an interval;

FIG. 15B is a drawing illustrating another example of correspondence between a distance and an interval;

FIG. 15C is a drawing illustrating still another example of correspondence between a distance and an interval;

FIG. 16A is a top view illustrating an example of a situation of the vehicle 8 and another vehicle 6;

FIG. 16B is a top view illustrating an example of a situation of the vehicle 8 and the another vehicle 6;

FIG. 16C is a top view illustrating an example of a situation of the vehicle 8 and the another vehicle 6;

FIG. 16D is an example of a drawing for explaining an interval between the display element 62 indicating the vehicle 8 and the indicator image 61 corresponding to the situation illustrated in FIG. 16A, in which case the display system 1 starts from the second AR mode;

FIG. 16E is an example of a drawing for explaining an interval between the display element 62 and the indicator image 61 corresponding to the situation illustrated in FIG. 16B;

FIG. 16F is an example of a drawing for explaining an interval between the display element 62 and the indicator image 61 corresponding to the situation illustrated in FIG. 16C;

FIG. 17 is an example of a drawing for explaining the size of the indicator image;

FIG. 18 is an example of a flowchart illustrating overall procedure of operation by an in-vehicle system;

FIG. 19 is a flowchart illustrating processing of an example in which the display system displays an indicator image;

FIG. 20A is a top view illustrating an example of a situation of the vehicle 8 and another vehicle 6;

FIG. 20B is a drawing illustrating an example of information displayed by the display system 1 according to a detection result of the another vehicle 6 as illustrated in FIG. 20A;

FIG. 20C is a top view illustrating an example of a situation of the vehicle 8 and the another vehicle 6;

FIG. 20D is a drawing illustrating an example of information displayed by the display system 1 according to a detection result of the another vehicle 6 as illustrated in FIG. 20C;

FIG. 20E is a top view illustrating an example of a situation of the vehicle 8 and the another vehicle 6;

FIG. 20F is a drawing illustrating an example of information displayed by the display system 1 according to a detection result of the another vehicle 6 as illustrated in FIG. 20E, in which case the indicator image 61 is hidden when the another vehicle 6 stays in the field of view of the occupant;

FIG. 21A is a top view illustrating an example of a situation of the vehicle 8 and another parked vehicle;

FIG. 21B is a drawing for explaining a display example in which an indicator image points to the another parked vehicle, according to a detection result of the another parked vehicle as illustrated in FIG. 21A;

FIG. 22A is a top view illustrating an example of a situation of the vehicle 8 and another vehicle 6;

FIG. 22B is a drawing illustrating an example of information displayed by the display system 1 according to a detection result of the another vehicle 6 as illustrated in FIG. 22A;

FIG. 22C is a top view illustrating an example of a situation of the vehicle 8 and the another vehicle 6;

FIG. 22D is a drawing illustrating an example of information displayed by the display system 1 according to a detection result of the another vehicle 6 as illustrated in FIG. 22C;

FIG. 22E is a top view illustrating an example of a situation of the vehicle 8 and the another vehicle 6;

FIG. 22F is a drawing illustrating an example of information displayed by the display system 1 according to a detection result of the another vehicle 6 as illustrated in FIG. 22E;

FIG. 23A is a drawing illustrating a display example of an indicator image and a display element indicating the vehicle 8;

FIG. 23B is a drawing illustrating a display example of an indicator image and a display element indicating the vehicle 8;

FIG. 23C is a drawing illustrating a display example of an indicator image and a display element indicating the vehicle 8;

FIG. 23D is a drawing illustrating a display example of indicator images and a display element indicating the vehicle 8; and FIG. 23E is a drawing illustrating a display example of indicator images and a display element indicating the vehicle 8.

DESCRIPTION OF EMBODIMENTS

Hereinafter, as an example of an aspect for carrying out the present invention, a display system and an image generation method performed by the display system will be described with reference to the drawings.

Overview of Display of Information According to the Present Embodiment

First, overview of an image generation method for generating information according to the present embodiment will be described with reference to FIGS. 1A to 1F. FIGS. 1A to 1F illustrate examples for explaining information displayed by the display system according to a detection result of an obstacle in surroundings. In the present embodiment, an aspect in which information is presented by an HUD (Head Up Display) apparatus will be explained as a display system. However, the present embodiment is not limited to the HUD, and can be applied to other display systems such as a liquid crystal display.

(1) In FIG. 1A, another vehicle 6 is detected as an obstacle at left rear side of a vehicle 8 equipped with a display system 1 according to the present embodiment. The display system starts display of an indicator image 61 indicating the direction of the another vehicle 6 with a display element 62 indicating the vehicle 8 being at the center. As illustrated in FIG. 1B, the display system presents information as a virtual image I in front of the front window shield (for example, several meters in front). In FIG. 1B, the vehicle speed "31 km/h" is displayed as the display element 62 indicating the vehicle 8. The indicator image 61 indicating the direction of the obstacle is displayed close to the display element 62 with the display element 62 being at the center. Since the another vehicle 6 is at the left rear side, the indicator image 61 is also arranged at the left rear side of the display element 62 and points to the left rear side with respect to the display element 62. In the following, it is assumed that the indicator image 61 is arranged in the same direction as the direction pointed to by the indicator image 61 as seen from the display element 62 (i.e., in the left rear side if the pointed direction is the left rear side).

By displaying the indicator image 61 pointing in the direction of the obstacle with the display element 62 indicating the vehicle 8 being at the center, the display system can appropriately inform an occupant such as a driver of the vehicle 8 as to in which direction the another vehicle 6 is present with respect to the vehicle 8. As described above, a display mode in which the indicator image 61, indicating the direction of the obstacle, is close to the display element 62 with the display element 62 being at the center will be referred to as a first AR mode.

(2) As illustrated in FIG. 1C, it is detected that the another vehicle 6 has moved to a side of the vehicle 8 (in an attempt to overtake the vehicle 8). Since the another vehicle 6 is at the left side, the display system displays the indicator image 61 indicating the left direction with the display element 62 indicating the vehicle 8 being at the center in such a manner that the indicator image 61 is close to the display element 62. As illustrated in FIG. 1C, an area in which the indicator image 61 is close to the display element 62 is an example of a "predetermined area" in the virtual image.

When the display system according to the present embodiment attains a "state ready to directly point to an obstacle within the display area of the display system", the display system displays the indicator image 61 directly pointing to the obstacle by moving the indicator image 61 in the display area of the virtual image I. The "state ready to directly point to an obstacle within the display area of the display system" will be explained later, but is, in short, a state in which an obstacle is present in the direction pointed to by the indicator image 61 without parts of the vehicle 8 blocking the view from the driver of the vehicle 8. "Moving the indicator image 61 in the display area" means moving the indicator image 61 away from the display element 62 indicating the vehicle 8 and causing the indicator image 61 to approach the obstacle. The display element 62 indicating the vehicle 8 is virtually displayed on the road surface with AR (Augmented Reality).

A display mode in a state in which the indicator image 61 moves in the display area of the virtual image I that is displayed when the display system attains the "state ready to directly point to an obstacle within the display area of the display system" as described above will be referred to as a second AR mode display. The indicator image 61 can move within the display area of the virtual image I, which may be difficult to understand from FIG. 1D, because FIG. 1D indicates the indicator image 61 immediately after the display system switches to the second AR mode display.

(3) As illustrated in FIG. 1E, it is detected that the another vehicle 6 has moved to a left front side of the vehicle 8 (having almost completed overtaking). Since the display system is in the second AR mode, not only the indicator image 61 is displayed pointing in the direction of the another vehicle 6, but also, on a straight line connecting the display element 62 indicating the vehicle 8 and the another vehicle 6, the indicator image 61 is displayed at a position according to the distance between the display element 62 indicating the vehicle 8 and the another vehicle 6. The closer the distance between the display element 62 indicating the vehicle 8 and the another vehicle 6 is, the closer the position to the another vehicle 6 (the outer side of the display area in the virtual image I) the indicator image 61 is displayed at. This allows the occupant to easily find the obstacle in the direction pointed to by the indicator image 61. That is, the occupant can find the distance to the another vehicle 6 according to how far the indicator image 61 has moved away from the display element 62 indicating the vehicle 8 (i.e., how close to the outer edge of the display area the indicator image 61 has moved). Therefore, the relative position (positional relationship) of the another vehicle 6 with respect to the vehicle 8 can be estimated from the direction and the distance.

In FIG. 1F, the indicator image 61 is on a substantially straight line connecting the display element 62 indicating the vehicle 8 and the another vehicle 6, and the indicator image 61 is farther from the display element 62 indicating the vehicle 8 than in the state of FIG. 1D. In other words, the indicator image 61 in the state of FIG. 1D gradually moves to the outer side of the display area while changing the pointing direction according to the change of the relative position between the display element 62 indicating the vehicle 8 and the another vehicle 6.

In this way, the display system of the present embodiment seamlessly transitions from the first AR mode to the second AR mode. In the second AR mode, the indicator image 61 moves in the direction approaching the obstacle while pointing the arrow head in the direction of the obstacle, which allows the occupant to easily find the distance and direction. While changing the pointing direction according to the change in the relative position between the display element 62 indicating the vehicle 8 and the another vehicle 6, the indicator image 61 pointing in the direction of the another vehicle 6 in the first AR mode moves toward the outside of the display area and eventually directly points to the another vehicle 6, which enables continuous warning about the obstacle in a limited display area. In this way, even with a display system that displays information in front of the vehicle as viewed from the occupant, the approach direction of the obstacle in surroundings can be appropriately presented to the occupant in a limited display area.

Definition of Terms

The "obstacle" is an object, a hurdle, a moving object, an unmoving object, and the like that obstructs travelling. The obstacle includes not only things but also people and animals.

The moving body may be anything which a person rides on the land, in the air, on the sea, or in the sea. In the present embodiment, a vehicle will be described as an example of the moving body. In addition, the display system according to the present embodiment can be mounted on aircrafts, ships, industrial robots, and the like.

The occupant of the vehicle is a person who visually recognizes information in the display system. For example, the occupant is a driver, but the occupant can be just a passenger. In addition, in a case of a self-driving moving body, none of the occupants may drive at all.

The surroundings of the moving body mean all of the front, the sides, and the back of the moving body, but the surroundings do not necessarily cover 360 degrees. The surroundings may not include the front of the moving body.

The indicator image is an image indicating the direction of the obstacle. The indicator image does not mean that it is in an arrow shape. The indicator image can be anything as long as it has a function of pointing. In addition to the symbol used as the indicator image in the drawings of the present embodiment, a symbol "→" may also be used as the indicator image, or a symbol having a certain convex portion may be used as the indicator image.

Information about the obstacle is information used by the indicator image to point to the obstacle, and is information about the position of the obstacle.

Configuration Example

FIG. 2 is an example of a drawing illustrating overview of the display system 1 mounted on the vehicle 8. The display system 1 includes a display control unit 20 (an example of a display control apparatus) and a display unit 10 (an example of a display apparatus).

The display system 1 is embedded in a dashboard, and projects an image to a front windshield 91 (transparent member) through an emission window 3 provided in the upper surface of the display system 1. The projected image is displayed as a virtual image I in front of the front windshield 91. The occupant V of the vehicle 8 can see information useful for driving while keeping the eyes on vehicles in front and the road surface (with little movement of the eyes). As long as the display system 1 can project an image on the front windshield 91, the display system 1 may be installed not only in the dashboard but also in a ceiling, a sun visor, and the like.

The display system 1 may be a general-purpose information processing terminal or a HUD dedicated terminal. The HUD dedicated terminal is simply referred to as a head-up display apparatus, and may be referred to as a navigation apparatus when the HUD dedicated terminal is integrated with the navigation apparatus. Alternatively, the HUD dedicated terminal integrated with the navigation apparatus may also be referred to as a PND (Portable Navigation Device). Still alternatively, the display system 1 may be referred to as a display audio apparatus (or a connected audio apparatus). The display audio apparatus is an apparatus that mainly provides AV (Audio Visual) and communication functions without having navigation functions.

General-purpose information processing terminals are, for example, smartphones, tablet terminals, mobile phones, PDAs (Personal Digital Assistants), notebook PCs, and wearable PCs (for example, wristwatch type, sunglasses type, and the like). The general-purpose information processing terminals are not limited thereto, and may be any devices and apparatuses as long as they have a generally-available information processing apparatus function. The general-purpose information processing terminals are usually used as information processing apparatuses that execute various applications. For example, when the general-purpose information processing terminal executes application software for a display system, the general-purpose information processing terminals displays information useful for driving in a manner similar to the dedicated HUD terminal.

In both of the cases of the general-purpose information processing terminal and the HUD dedicated terminal, the display system 1 according to the present embodiment may be able to switch between an in-vehicle state and a portable state.

As illustrated in FIG. 2, the display system 1 has a display unit 10 and a display control unit 20 as main constituent elements. As a projection method of the display unit 10, a laser scanning method and a panel method are known. The laser scanning method is a method in which a laser beam emitted from a laser light source is scanned by a two-dimensional scanning device to form an intermediate image (a real image projected onto a screen described later). The panel method is a method for forming an intermediate image with an imaging device such as a liquid crystal panel, a DMD panel (digital mirror device panel), or a vacuum fluorescent display (VFD).

Unlike the panel method which forms an image by emitting light from the entire screen and partially shielding the light, the laser scanning method can cause each pixel to emit light or not to emit light. In general, the laser scanning method is preferable because a high-contrast image can be formed by the laser scanning method. It has been found that, since the laser scanning method is excellent in visibility because of high contrast, the laser scanning method allows the occupant of the vehicle to visually recognize information with less attentional resources than the panel method HUD apparatuses.

In particular, in the panel method, light that leaks from shielding is projected even in areas where there is no information, and a display frame is projected in the area where the HUD can display images (this phenomenon is called a postcard effect). With the laser scanning method, such a phenomenon does not occur, and only the content can be projected. In particular, in AR (Augmented Reality), the reality is improved when the generated image is superimposed and displayed on the existing scenery. The AR is a technology that virtually augments the world in front of a person by overlaying and displaying images of objects that do not exist in the actual scenery. Instead of the laser scanning method HUD apparatus, the panel method HUD apparatus can be employed if the panel method HUD apparatus can display information in a manner that can be visually recognized with less attentional resources (with less fatigue).

FIG. 3 is an example of a drawing illustrating a configuration of the display unit 10. The display unit 10 mainly includes a light source unit 101, an optical deflector 102, a mirror 103, a screen 104, and a concave mirror 105. FIG. 3 only illustrates main constituent elements, and may have constituent elements other than those illustrated, or may not have some of the constituent elements illustrated.

The light source unit 101 includes, for example, three laser light sources (hereinafter referred to as LDs (laser diodes)) that support RGB (Red, Green, and Blue), a coupling lens, an aperture, a combining element, a lens, and the like. The light source unit 101 is configured to combine the laser beams emitted from the three LDs and guides the laser beams toward the reflection surface of the optical deflector 102. The laser beam guided to the reflecting surface of the optical deflector 102 is deflected two-dimensionally by the optical deflector 102.

As the optical deflector 102, for example, a micromirror that oscillates with respect to two orthogonal axes, or two micromirrors that each oscillate or rotate with respect to one axis can be used. The optical deflector 102 can be, for example, a MEMS (Micro Electro Mechanical Systems) mirror manufactured by a semiconductor process or the like. The optical deflector 102 can be driven by, for example, an actuator that uses the deformation force of the piezoelectric element as a driving force. As the optical deflector 102, a galvanometer mirror or a polygon mirror may be used.

The laser beam two-dimensionally deflected by the optical deflector 102 enters the mirror 103 to be reflected by the mirror 103, and renders a two-dimensional image (intermediate image) on the surface (scanned surface) of the screen 104. For example, a concave mirror can be used as the mirror 103, but a convex mirror or a plane mirror may be used. By deflecting the direction of the laser beam with the optical deflector 102 and the mirror 103, the display unit 10 can be downsized or the arrangement of the constituent elements can be flexibly changed.

The screen 104 is preferably a microlens array or a micromirror array that has the function of diverging the laser beam at a desired divergence angle, but may also be a laser diffusing plate for diffusing the beam, a transmission plate or a reflecting plate with smooth surface, and the like. Generally, the constituent elements from the light source unit 101 to the screen 104 are collectively referred to as an HUD apparatus. However, the HUD apparatus may include other parts.

The laser beam emitted from the screen 104 is reflected by the concave mirror 105 and projected onto the front windshield 91. The concave mirror 105 has a function similar to that of a lens, and has a function of forming an image at a predetermined focal length. Therefore, if the concave mirror 105 were be a lens, the image on the screen 104 corresponding to the object would form an image at a position of a length $R_2$ according to the focal length of the concave mirror 105. Therefore, when viewed from an occupant of the vehicle, the virtual image I is displayed at the position of the length $R_1+R_2$ from the front windshield 91. Where the length from an occupant of the vehicle to the front windshield 91 is denoted as R3, the virtual image I is displayed (formed) at the position of a length R ($=R_1+R_2+R_3$) from a viewpoint E of an occupant V of the vehicle 8 in FIG. 3.

At least a part of the light flux to the front windshield 91 is reflected toward the viewpoint E of the occupant V of the vehicle 8. As a result, the occupant V of the vehicle 8 can visually recognize, through the front windshield 91, the virtual image I acquired by enlarging the intermediate image on the screen 104. That is, the virtual image I which is an enlarged intermediate image is displayed through the front windshield 91 as viewed from the occupant V of the vehicle 8.

Normally, the front windshield 91 is not flat but is slightly curved. For this reason, a length R is substantially determined by the length $R_1+R_2$ as described above, although the imaging position of the virtual image I is affected not only by the focal length of the concave mirror 105 but also by the curved surface of the front windshield 91. In order to form the virtual image I far away so as to reduce the eye movement, the length $R_1$ or $R_2$ is increased. One way to increase the length $R_1$ is to use a mirror to turn the optical path, and another way to increase the length $R_2$ is to adjust the focal length of the concave mirror 105.

It should be noted that due to the front windshield 91, an optical distortion occurs in which the horizontal line of the intermediate image has an upward or downward convex shape. Therefore, it is preferable that at least one of the mirror 103 and the concave mirror 105 is designed and arranged so as to correct the distortion. Alternatively, it is preferable that the projected image is corrected in consideration of the distortion.

Further, a combiner may be arranged as a transmission and reflection member at the side of the viewpoint E with respect to the front windshield 91. Even where the light from the concave mirror 105 is emitted to the combiner, information can be presented as a virtual image I in a manner similar to the case where the light from the concave mirror 105 is emitted onto the front windshield 91.

<Configuration Example of In-Vehicle System Having Display System>

Next, a configuration example in a case where the display system 1 is mounted on a moving body will be explained with reference to FIG. 4. FIG. 4 is an example of a configuration diagram illustrating an in-vehicle system 2 in which the display system 1 is mounted on the moving body. The in-vehicle system 2 includes a car navigation system 11 that communicates via an in-vehicle network NW such as a CAN (Controller Area Network) bus, an engine ECU (Electronic Control Unit) 12, a display system 1, a brake ECU 13, a steering ECU 14, a recognizing unit 15, and a detecting unit 16.

The car navigation system 11 has a Global Navigation Satellite System (GNSS) such as a GPS (Global Positioning System), detects the current location of the vehicle, and displays the position of the vehicle on an electronic map. The car navigation system 11 also receives inputs of the starting point and the destination, searches a route from the starting point to the destination, displays the route on the electronic map, and provides guidance about the direction of travel to the occupant of the vehicle by voice, text, animation (displayed on the display), or the like, before making a turn. The car navigation system 11 may communicate with a server via a cell network or the like. In this case, the server can send the electronic map to the vehicle 8 or perform a route search.

The engine ECU 12 determines an ideal fuel injection amount, advances or retards the ignition timing, controls the valve actuation mechanism, and the like according to the information from the sensors and the vehicle situations. Also, the engine ECU 12 determines whether to shift the gear by, e.g., referring to a map defining a shifting line for a gear with respect to a relationship between the current vehicle speed and the throttle opening. The engine ECU 12 performs the combinations of the above to perform acceleration and deceleration control for adaptive cruise control to follow a vehicle ahead. Together with the engine or without using the engine as the power source, an electric motor may be used as a power source.

The brake ECU 13 controls the braking force for each of the wheels of the vehicle even when the brake pedal is not operated by the occupant of the vehicle. Examples of such controls performed by the brake ECU 13 include ABS (Antilock Braking System) control, braking control in adaptive cruise control for following a vehicle ahead, pre-crash braking based on TTC (Time To Collision) with an obstacle, hill-start assist control for holding the brake when the vehicle starts on a slope, and the like.

The steering ECU 14 detects the steering direction and the steering amount of the steering wheel operated by the occupant of the vehicle, and performs power steering control for adding a steering torque in the steering direction. Even when the occupant of the vehicle does not perform steering, the steering ECU 14 performs steering in a direction to avoid departure from a travelling lane, in a direction to maintain travelling at the center of the travelling lane, or in a direction to avoid approaching an obstacle.

The detecting unit 16 has various sensors and detects obstacles around the vehicle 8. The recognizing unit 15 recognizes what the obstacle detected by the detecting unit 16 is, recognizes the relative position (direction and distance) of the obstacle with respect to the vehicle 8, and recognizes the relative position (direction and distance) of the obstacle with respect to the display element 62 indicating the vehicle 8. The information such as the vehicle speed, and identification results of obstacles, and the relative positions are input to the display system 1.

<Configuration Example of Detecting Unit>

Next, the configuration of the detecting unit 16 will be explained with reference to FIG. 5. FIG. 5 is a drawing illustrating a configuration example of the detecting unit 16 of the in-vehicle system 2. The detecting unit 16 includes a vehicle speed sensor 161 for detecting the vehicle speed to be displayed by the display system 1, a vehicle information sensor 162 configured to acquire vehicle information to be displayed by the display system 1, a radar sensor 163 and an ambient camera 164 for detecting obstacles, an occupant state information sensor 165 for acquiring occupant state information which is information about occupants, a VICS (Vehicle Information and Communication System Center, registered trademark) reception apparatus 166 for receiving traffic jam information from outside, and an external communication apparatus 167 for connection with the Internet and the like.

It should be noted that the sensors included in the detecting unit 16 may not be provided in a concentrated manner in the detecting unit 16, but may be provided in any manner as long as these sensors are mounted on the in-vehicle.

The vehicle speed sensor 161 detects a magnet that rotates with the rotation of the shaft of the drive train system with a sensor unit fixed to the vehicle body, and generates a pulse wave proportional to the rotation speed. The vehicle speed can be detected by the number of pulses per unit time.

The vehicle information sensor 162 has one or more sensors that detect vehicle information other than the vehicle speed sensor 131. Examples of such sensors include a fuel gauge sensor, a shift lever position sensor, an odometer, a trip meter, a turn signal sensor, and a water temperature sensor. These sensors may acquire pieces of vehicle information with a generally-available structure. The fuel gauge sensor detects the amount of fuel remaining. The shift lever position sensor detects the shift lever position operated by the occupant of the vehicle. The odometer accumulates the travelling distances of the vehicle, and provides the total travelling distance. The trip meter provides the distance traveled since the occupant of the vehicle last initialized the trip meter. The turn signal sensor detects the direction of the turn signal operated by the occupant of the vehicle. The water temperature sensor detects the temperature of the engine coolant. These are just examples of information that can be acquired from the vehicle, and other information that can be acquired from the vehicle can be adopted as the vehicle information. For example, in an electric vehicle or a hybrid vehicle, the remaining amount of battery, the amount of regenerative power, or the amount of power consumption can also be acquired.

The ambient camera 164 is of imaging apparatuses that capture images of the surroundings of the vehicle. The imaging apparatuses of the ambient camera 164 are preferably installed at multiple positions so that the rear image can be captured from the sides of the vehicle. For example, the imaging apparatuses of the ambient camera 164 are installed in a left rear corner, a right rear corner, and a rear portion, and the like, in the roof or the bumper. The imaging apparatus installed at the rear is referred to as a rearview monitor, but the ambient camera 164 at the rear is not limited to the rearview monitor. In addition, the ambient camera 164 may be disposed on a side mirror, a pillar, a side part of a roof, or a door. The ambient camera 164 may include an imaging apparatus that captures images in the front. For example, the imaging apparatuses of the ambient camera 164 can be attached to or in proximity to the back of the rearview mirror.

The ambient camera 164 may be a monocular camera or a stereo camera. In the case of a monocular camera or a stereo camera that can acquire distance information, the radar sensor 163 may be omitted. However, when the radar sensor 163 is provided in addition to the ambient camera 164 that can acquire distance information, the distance information acquired by the ambient camera 164 and the distance information acquired by the radar sensor 163 may be combined (integrated), and highly accurate distance information can be acquired by complementing the disadvantages of each other. In addition to the radar sensor 163 and the ambient camera 164, a sonic sensor (ultrasonic sensor) may be provided.

The radar sensor 163 transmits radio waves to the surroundings of the vehicle, such as the front, sides, and rear of the vehicle 8, and receives the radio waves reflected and returned by the object. The radar sensor 163 may be arranged at such locations that the radar sensor 163 can detect obstacles around the vehicle in a manner similar to the ambient camera 164. The radar sensor 163 may use a TOF (Time of Flight) method to detect the distance to an object according to the time from transmission to reception, and detect the direction of the object according to the emission direction of the radar. LIDAR (Light Detection and Ranging, Laser Imaging Detection and Ranging) is known as a radar sensor of the TOF method. In addition, the FMCW method (Frequency Modulation Continuous Wave) generates a mixed wave of the reception wave and the transmission wave while continuously increasing the frequency of the transmission wave, and converts the beat frequency of the mixed wave generated from slightly different frequencies into a distance. In the FMCW method, the direction of the object is estimated by detecting the phase shift of the reception waves with multiple reception antennas.

The occupant state information sensor 165 is a sensor that detects the occupant state information detected directly or indirectly from the occupant of the vehicle. A typical example of the occupant state information sensor 165 is a face camera. The face camera captures images of the face of the occupant of the vehicle and performs face authentication to identify or distinguish the occupant of the vehicle. The face direction and the gaze direction can be detected from the face image.

In addition, the occupant state information sensor 165 may be, for example, an electrocardiograph sensor, a heart rate sensor, a blood pressure sensor, a body temperature sensor, a pulse sensor, a respiratory sensor, a sweat sensor, a blink sensor, a pupil sensor, a brain wave sensor, or a myoelectric potential sensor. The occupant state information sensor 165 may be, for example, in such a form that the occupant of the vehicle wears a wristwatch-type wearable terminal (a smart watch).

The VICS reception apparatus 166 receives radio waves distributed by VICS. The VICS is a system that transmits road traffic information about, e.g., traffic congestion and traffic regulations, to the in-vehicle apparatus in real time using FM multiplex broadcasting and beacons. The external communication apparatus 167 is connected to the Internet via a network such as 3G, 4G, 5G, LTE, or wireless LAN, to receive various kinds of information. For example, the external communication apparatus 167 can receive weather information such as rainfall, snowfall, and fog. Also, the external communication apparatus 167 may receive news, music, video, and like. Further, the external communication apparatus 167 can acquire, for example, the state information about a traffic light and the time it takes for the traffic light to change. As described above, the VICS reception apparatus 166 and the external communication apparatus 167 may perform road-to-vehicle communication. In addition, the external communication apparatus 167 may acquire information detected by other vehicles 6 through inter-vehicle communication.

The advanced driver-assistance systems (ADAS) not only displays and warns the information, but also controls the vehicle. In this case, the ECU performs various driving support in cooperation with the engine ECU 12, the brake ECU 13, and the steering ECU 14 based on the distance information about the obstacle detected by at least one of the radar sensor 163 and the ambient camera 164. For example, the ECU performs braking control in adaptive cruise control for following a vehicle ahead, pre-crash braking, avoidance of departure from a travelling lane, lane keep cruising, and hill-start assist control for holding the brake when the vehicle starts on a slope, steering for avoiding the obstacle, and the like. For such control, the ECU recognizes road signs and road paint such as white lines from the image data captured by the imaging apparatus that captures images in the front.

In acceleration and deceleration control during adaptive cruise control, the ECU controls the driving power and the braking force to maintain the target distance according to vehicle speed. In the pre-crash braking, depending on the TTC, a warning and a display prompting the driver to press the brake pedal are displayed, and, if the possibility of collision is high, the seat belt is tightened and collision avoidance braking is activated. In avoidance of departure from a travelling lane, the driving assistance ECU 36 recognizes white lines (i.e., separation lines between neighboring lanes) from the captured image data, and adds a steering torque in a direction opposite to the direction of departing from a travelling lane. In lane keeping cruising, the center of a travelling lane is set as a target travelling line, and a steering torque proportional to a departure from the target travelling line is applied in the direction opposite to the departure. In the obstacle avoidance steering, in a case where it is determined that a collision cannot be avoided by braking, a travelling line for avoiding an obstacle is determined, and a steering torque for travelling along the travelling line is applied.

Also, for example, in a case where, when it is attempted to make a lane change, the radar sensor 163 or the ambient camera 164 detects a vehicle cruising in an area (i.e., a blind spot) of a neighboring lane that cannot be seen with the door mirror, and gives a warning to the occupant. Such a support is referred to as a blind spot monitor.

<Recognition Unit>

Next, FIG. 6 will be used to explain the information about the obstacle recognized by the recognizing unit 15 based on the information detected by the detecting unit 16. FIG. 6 is a drawing illustrating an example of a function of the recognizing unit 15. The recognizing unit 15 includes a target determining unit 151 and a relative position determining unit 152.

The target determining unit 151 mainly analyzes the ambient image data acquired by the ambient camera 164 and determines the type of the obstacle shown in the captured image data. In the present embodiment, for example, the target determining unit 151 determines another vehicle 6, a pedestrian, a two-wheeled vehicle, or others. In the present embodiment, it is not always necessary to determine what the obstacle is, but for example, the display system 1 can be prevented from displaying an indicator image 61 for a wall classified as "others". The shape of the indicator image 61 can be changed depending on the type of the obstacle.

When the ambient camera 164 is a stereo camera, each pixel or pixel block of the ambient image data includes distance information. Such ambient image data is referred to as a distance image. The target determining unit 151 can determine the obstacle not only from the ambient image data but also from a radar ranging information. For example, in a case where the density of a point cloud of the LIDAR is sufficiently high, the shape of the obstacle can be acquired, and therefore, the type of obstacle can be determined by analyzing the shape.

One of the methods by which the target determining unit 151 determines the target is an image recognition method using machine learning. The machine learning is a technology that allows a computer to acquire learning ability like a human, and allows the computer to autonomously generate an algorithm used for determination, such as data identification, from learning data given in advance and to apply the learned algorithm to perform prediction with regard to new data. The learning method for machine learning may be any one of supervised learning, unsupervised learning, semi-supervised learning, reinforcement learning, and deep learning, and may be a learning method acquired by combining these learning methods, and the learning method for machine learning is not limited. The methods of machine learning include perceptron, deep learning, support vector machine, logistic regression, naive bayes, decision tree, and random forest.

The relative position determining unit 152 determines the relative position (the direction and the distance) of the obstacle with respect to the vehicle 8 or the display element 62 indicating the vehicle 8, as illustrated in FIG. 7. FIG. 7 is a drawing for explaining an example of a relative position of an obstacle with respect to the vehicle 8 or the display element 62 indicating the vehicle 8. As illustrated in FIG. 7, it is assumed that the display element 62 indicating the vehicle 8 (the center of the virtual image I) is displayed at a position of P in the vehicle longitudinal direction and Q in the vehicle lateral direction from the center of the vehicle.

It is assumed that, in the ambient image data or the radar ranging information, it has been detected that the another vehicle 6 is at a coordinate (A, B) with respect to the center of the vehicle serving as the origin. The distance from the center of the vehicle to the another vehicle 6 is denoted as $L_1$, and the direction is denoted as $\theta_1$. In a case where the ambient image data is a distance image, the coordinate (A, B) can be derived directly, but in the case where the ambient image data is radar ranging information, distance and direction may be decomposed into (A, B). The relative position determining unit 152 converts the coordinate (A, B) into a coordinate (C, D) with respect to the display element 62 indicating the vehicle 8.

The display element 62 indicating the vehicle 8 is presented as a virtual image I, and therefore exists at a fixed position in front of the vehicle 8. As illustrated above, where the distance in the vehicle lateral direction from the center of the vehicle to the display element 62 indicating the vehicle 8 is denoted as Q and the distance in the vehicle longitudinal direction from the center of the vehicle to the display element 62 indicating the vehicle 8 is denoted as P, the coordinate (C, D) is determined as follows.

$$(C,D)=(A+Q,B+P)$$

The relative position determining unit 152 performs similar processing for each radar sensor or ambient camera provided in the vehicle, and determines the relative position of the obstacle with respect to the display element 62 indicating the vehicle 8. By determining the relative position, the distance and the direction are also determined. The distance from the display element 62 indicating the vehicle 8 to the another vehicle 6 is denoted as $L_2$, and its direction is denoted as $\theta_2$. In the example of FIG. 7, the distance $L_2$ is $\sqrt{(C^2+D^2)}$, and the direction $\theta_2$ is arctan(D/C). It should be noted that the reference (of which the direction is assumed to be 0 degrees) of the directions $\theta_1$ and $\theta_2$ may be set as appropriate. In FIG. 7, the 9 o'clock direction is defined as 0 degrees.

<Hardware Configuration Example of Display Control Unit>

Next, a hardware configuration example of the display control unit 20 will be explained with reference to FIG. 8. FIG. 8 is an example of a hardware configuration diagram of the display control unit 20. The display control unit 20 includes an FPGA 201, a CPU 202, a ROM 203, a RAM 204, an I/F 205, a bus line 206, an LD driver 207, and a MEMS controller 208. The FPGA 201, the CPU 202, the ROM 203, the RAM 204, and the I/F 205 are connected to each other via the bus line 206.

The CPU 202 controls each of the functions of the display control unit 20. The ROM 203 stores a program 203p that the CPU 202 executes to control the functions of the display control unit 20. The program 203p is stored in the RAM 204, and the CPU 202 uses the RAM 204 as a work area for executing the program 203p. The RAM 204 has an image memory 209. The image memory 209 is used to generate the image projected as the virtual image I. The I/F 205 is an interface for communicating with the recognizing unit 15 and the detecting unit 16, and is connected to a CAN (Controller Area Network) bus, an Ethernet (registered trademark), or the like of the vehicle 8, for example.

The FPGA 201 controls the LD driver 207 based on the image generated by the CPU 202. The LD driver 207 controls the light emission of the LD according to the image by driving the LD of the light source unit 101 of the display unit 10. The FPGA 201 operates the optical deflector 102 of the display unit 10 via the MEMS controller 208 so as to deflect the laser beam in the direction corresponding to the pixel position of the image.

<Functions of Display Control Unit>

Next, the functions of the display control unit 20 will be described with reference to FIG. 9. FIG. 9 is an example of a functional block diagram illustrating, with blocks, the functions of the display control unit 20. The display control unit 20 includes an information acquiring unit 21, an image conversion unit 22, a mode determining unit 23, an interval-&-size determining unit 24, a display image generation unit 25, and an output unit 26. These functions of the display control unit 20 are functions or means realized by the CPU 202 executing the program 203p copied from the ROM 203 of the display control unit 20 to the RAM 204.

The information acquiring unit 21 acquires the information to be displayed by the display unit 10 and the information for displaying the indicator image 61 in the first AR mode or the second AR mode from the detecting unit 16 and the recognizing unit 15. For example, the information acquiring unit 21 acquires the vehicle speed and the like from the detecting unit 16, and the type of obstacle and the relative position (distances $L_1$, $L_2$, directions $\theta_1$, $\theta_2$) from the recognizing unit 15. Also, the information acquiring unit 21 discards the type of the obstacle, the relative position, and the like, in a case where the obstacle does not need to be pointed to by the indicator image 61 (i.e., when the obstacle is determined to be "others"). However, the vehicle speed and the like are displayed continuously.

The image conversion unit 22 selects the indicator image 61 based on the direction $\theta_1$ of the obstacle (the direction $\theta_1$ with respect to the vehicle 8), and converts the indicator image 61 into an indicator image 61 suitable for the AR display on the road surface. In other words, the displayed indicator image 61 is converted so that the displayed indicator image 61 appears to be a natural arrow shape when the indicator image 61 is displayed on the road surface by the display unit 10. The details of the conversion will be described later. The image conversion unit 22 sends the direction $\theta_1$ of the obstacle as seen from the vehicle 8 and the indicator image 61 to the display image generation unit 25.

The mode determining unit 23 determines whether the display system 1 is to be in the first AR mode or the second AR mode based on the distance $L_2$ and the direction $\theta_2$ of the obstacle with respect to the display element 62 indicating the vehicle 8. Also, the mode determining unit 23 determines whether or not to terminate the second AR mode.

In a case where the display system 1 is in the second AR mode, the interval-&-size determining unit 24 determines the interval D (i.e., distance) between the indicator image 61 and the display element 62 indicating the vehicle 8 and the size of the indicator image 61, on the basis of the distance $L_2$ between the display element 62 indicating the vehicle 8 and the obstacle.

The display image generation unit 25 arranges, as the display element 62 indicating the vehicle 8, the vehicle speed and the like at the center of the display area. Also, the display image generation unit 25 arranges the indicator image 61 in accordance with the display mode of the indicator image 61. Note that the display image generation unit 25 generates data about the indicator image 61. The display image generation unit 25 arranges the indicator image 61 in the first and second AR modes as follows.

(1) In the first AR mode, the display image generation unit 25 arranges, with the display element 62 indicating the vehicle 8 being at the center, the indicator image 61 close to the display element 62 in the same direction as the direction $\theta_1$ of the obstacle with respect to the vehicle 8.

(2) In the second AR mode, the display image generation unit 25 arranges, in the same direction as the direction $\theta_1$ of the obstacle with respect to the vehicle 8, the indicator image 61 away from the display element 62 indicating the vehicle 8 by the interval D that is determined by the interval-&-size determining unit 24.

The output unit 26 outputs the display element 62 indicating the vehicle 8 and the indicator image 61 generated by the display image generation unit 25. That is, by controlling the LD driver 207 and the MEMS controller 208, the display element 62 and the indicator image 61 generated by the display image generation unit 25 are displayed on the display unit 10.

<Conversion of Indicator Image>

FIGS. 10A and 10B are examples of drawings illustrating a conversion of the indicator image 61. FIG. 10A is a drawing assuming a case where a pre-conversion image 53, which is to be converted into an AR image, is displayed as if it is painted on a road surface 301 in front of the vehicle 8. When the pre-conversion image 53, which is longer in the travelling direction, is assumed to be actually painted on the road surface 301, it appears to the occupant V that the pre-conversion image 53 is in a less-distorted shape of an indicator image due to a projection relationship between the viewpoint of the occupant V and the road surface 301. In the present embodiment, a plurality of pre-conversion images 53 are prepared in advance in accordance with the direction $\theta_1$ of the obstacle with respect to the vehicle 8.

Similarly, FIG. 10B is a side view illustrating the pre-conversion image virtually painted on the road surface 301 and the vehicle 8. For example, the vehicle lateral direction of the vehicle 8 is defined as an x axis, the vertical direction is defined as a y axis, and the travelling direction is defined as a z axis. The coordinate of one of the vertexes of the pre-conversion image is denoted as $(x_1, y_1, z_1)$. Where a predetermined origin that moves with the vehicle 8 (e.g., the center of the vehicle) is defined, the height $y_1$ to the road surface 301 is known. Also, the distance $z_1$ to the pre-conversion image may be a constant value or determined according to the distance of the obstacle. The position of the pre-conversion image in the x direction is assumed to be in front of the vehicle 8 (because the position in the display area is determined separately). Therefore, the coordinate $(x_1, y_1, z_1)$ is known.

FIG. 11 is an example of a drawing for explaining a perspective projection position conversion of the pre-conversion image 53 painted on the road surface 301 into a projection surface 54. The image conversion unit 22 performs the perspective projection position conversion of the pre-conversion image, but the projection surface 54 is to be set for the perspective projection position conversion. The projection surface 54 is a two-dimensional plane on which the pre-conversion image 53 is projected. The projection surface 54 represents the field of view of the occupant V, and in a case where the HUD apparatus displays an AR image, the driver sees the virtual image I, and a plane substantially perpendicular to the projection position of the virtual image I is set as the projection surface 54. The size of the projection surface 54 is also appropriately determined according to the size of the display area and the like (substantially the same as the display area).

The image conversion unit 22 performs perspective projection position conversion on the projection surface 54. As a result, it appears to the driver that the pre-conversion image 53 is converted into the less distorted indicator image 61.

<Switching of First AR Mode and Second AR Mode>

As described above, the first AR mode is a display mode for displaying the indicator image 61 pointing to the obstacle in proximity to (i.e., without any interval from) the surroundings of the display element 62 indicating the vehicle 8. The first AR mode is activated in a case where the display system 1 is not in the "state ready to directly point to the obstacle within the display area of the display system" but the obstacle is detected within a predetermined distance from the vehicle 8. For example, the first AR mode can be started when the blind spot monitor detects an obstacle.

The second AR mode is a display mode in which the indicator image 61 in the virtual image I pointing in the direction of the obstacle can be moved in the direction approaching the obstacle (there can be an interval between the display element 62 indicating the vehicle 8 and the indicator image 61). In addition, the size of the indicator image 61 can be changed. The size of the indicator image 61 may be changed even in the first AR mode. The second AR mode starts in response to the "state ready to directly point to the obstacle within the display area of the display system". The display system 1 may transition to the second AR mode from the first AR mode, or may start from the second AR mode.

FIGS. 12A and 12B are drawings illustrating an example of a determination method for determining the first AR mode and the second AR mode. In FIG. 12A, another vehicle 6 is detected at a left rear side of the vehicle 8. A straight line connecting the display element 62 indicating the vehicle 8 and the another vehicle 6 (more specifically, for example, a closest part of the another vehicle 6) overlaps the vehicle 8. The second AR mode can be said to be a state in which the obstacle exists without the vehicle 8 interposed in the direction pointed to by the indicator image 61, and FIG. 12A is not in the "state ready to directly point to the obstacle within the display area of the display system", and therefore, the display system 1 determines to enter the first AR mode.

In FIG. 12B, another vehicle 6 is detected at a left side of the vehicle 8. A straight line connecting the display element 62 indicating the vehicle 8 and the another vehicle 6 (more specifically, for example, a closest part of the another vehicle 6) does not overlap the vehicle 8. Therefore, since the display system 1 is in the "state ready to directly point to the obstacle within the display area of the display system", the display system 1 determines to enter the second AR mode.

As illustrated in FIGS. 12A and 12B, whether the display system 1 is in the "state ready to directly point to the obstacle within the display area of the display system" or not can be considered to be correlated with the direction $\theta_2$ of the another vehicle 6 with respect to the display element 62 indicating the vehicle 8. The mode determining unit 23 compares the direction $\theta_2$ of the another vehicle 6 detected within a predetermined distance, e.g., another vehicle 6 determined to be a warning target by the blind spot monitor, with a threshold value to determine whether the display system 1 is to enter the second AR mode.

As illustrated in FIG. 13, the second AR mode is terminated in a case where the another vehicle 6 comes into the field of view of the occupant (for example, the driver). FIG. 13 is an example of a drawing for explaining timing at which an indicator image is hidden. A determination as to whether or not the another vehicle 6 has come into the field of view of the occupant may be made according to the direction of gaze acquired by the occupant state information sensor 165, or may be determined by comparing, with a threshold value, the directions $\theta_1$ or $\theta_2$ of the another vehicle 6 with respect to the vehicle 8 or the display element 62 indicating the vehicle 8. For example, in FIG. 13, since $\theta_2$ is zero, the display system 1 determines to terminate the display of the indicator image 61 in the second AR mode.

<Interval Between Display Element Indicating Vehicle in Question and Indicator Image>

In the second AR mode, an interval D between the display element 62 indicating the vehicle 8 and the indicator image 61 changes according to a distance $L_2$ between the display element 62 indicating the vehicle 8 and the obstacle. In other words, the larger the distance $L_2$ between the display element 62 indicating the vehicle 8 and the obstacle is, the smaller the interval D between the display element 62 indicating the vehicle 8 and the indicator image 61 becomes. Conversely, the smaller the distance $L_2$ between the display element 62 indicating the vehicle 8 and the obstacle is, the larger the interval D between the display element 62 indicating the vehicle 8 and the indicator image 61 becomes.

FIGS. 14A to 14F are examples of drawings for explaining an interval between the display element 62 indicating the vehicle 8 and the indicator image 61. FIG. 14A is assumed to be a state immediately after the display system 1 is determined to enter the second AR mode. The distance between the display element 62 indicating the vehicle 8 and the another vehicle 6 is denoted as $L_{2-1}$, and the direction of the another vehicle 6 as seen from the vehicle 8 is denoted as $\theta_{1-1}$. FIG. 14B is a state in which the another vehicle 6 has moved slightly more forward than the vehicle 8. The distance between the display element 62 indicating the vehicle 8 and the another vehicle 6 is denoted as $L_{2-2}$, and the direction of the another vehicle 6 as seen from the vehicle 8 is denoted as $\theta_{1-2}$. FIG. 14C is a state in which the another vehicle 6 has moved completely ahead of the vehicle 8. The distance between the display element 62 indicating the vehicle 8 and the another vehicle 6 is denoted as $L_{2-3}$, and the direction of the another vehicle 6 as seen from the vehicle 8 is denoted as $\theta_{1-3}$.

Therefore, an inequality $L_{2-1} > L_{2-2} > L_{2-3}$ holds. Also, an inequality $\theta_{1-1} < \theta_{1-2} < \theta_{1-3}$ holds (with regard to absolute values). For example, the distance $L_{2-3}$ is the minimum value of the distance between the display element 62 indicating the vehicle 8 and the obstacle.

The smaller the distance $L_2$ between the display element 62 indicating the vehicle 8 and the obstacle is, the larger the interval D between the display element 62 indicating the vehicle 8 and the indicator image 61 becomes. Therefore, the interval $D_1$ of FIG. 14D corresponding to the state of FIG. 14A is the minimum value $D_{min}$ (i.e., a state in which the indicator image 61 is approximately close to the display element 62). The interval $D_2$ of FIG. 14E corresponding to the state of FIG. 14B is slightly larger than $D_1$, and the interval $D_3$ of FIG. 14F corresponding to the state of FIG. 14C is larger than $D_2$. Therefore, the occupant can easily find how far the obstacle is located with respect to the display element 62 indicating the vehicle 8.

The interval-&-size determining unit 24 associates the distance $L_{2-1}$ with $D_{min}$, and associates the distance $L_{2-3}$ with the maximum value $D_{max}$ of the interval D (i.e., a state in which the indicator image 61 is at the outermost edge of the display area). In a case of any given distance $L_2$, the interval-&-size determining unit 24 determines the interval D accordingly.

FIG. 15 illustrates an example of a correspondence between the distance $L_2$ and the interval D. FIG. 15A illustrates a case where the correspondence between the distance $L_2$ and the interval D is linear. FIG. 15B illustrates a case where the correspondence between the distance $L_2$ and the interval D is nonlinear, in such a manner that it is easy to maintain a state in which the interval D is large. FIG. 15C illustrates a case where the correspondence between the distance $L_2$ and the interval D is nonlinear, in such a manner that it is easy to maintain a state in which the interval D is small. The correspondence suitable for warning the obstacle is used.

Referring back to FIGS. 14D to 14F, the angles of lines connecting the centers of the indicator image 61 and the display element 62 indicating the vehicle 8 are almost the same as $\theta_{1-1}$, $\theta_{1-2}$, $\theta_{1-3}$, respectively. The display image generation unit 25 arranges the indicator image 61 at a position, in the display area of the virtual image I, which is determined by the direction $\theta_1$ of the another vehicle 6 as seen from the vehicle 8 and the interval D determined by the interval-&-size determining unit 24. Therefore, it is easy for the occupant to find in which direction the obstacle is located with respect to the display element 62 indicating the vehicle 8.

<Case in which Display System Starts from Second AR Mode>

As illustrated in FIGS. 16A to 16F, in a case where the obstacle ahead of the vehicle 8 is detected, the display system 1 starts from the second AR mode. FIGS. 16A to 16F are drawings for explaining the interval D between the display element 62 indicating the vehicle 8 and the indicator image 61 in a case where the display system 1 starts from the second AR mode. FIGS. 16A to 16F assume a situation in which the vehicle 8 overtakes another vehicle 6.

FIG. 16A illustrates a state in which the recognizing unit 15 of the vehicle 8 detects that another vehicle 6 ahead is within a predetermined distance. The mode determining unit 23 determines that the distance is within the predetermined distance, and the direction is in the "state ready to directly point to the obstacle within the display area of the display system", and determines that the display system 1 is to be in the second AR mode. When the display system 1 starts from the second AR mode, the display system 1 does not terminate the second AR mode when another vehicle 6 comes into the field of view of the occupant (for example, the driver) if only for a short period of time. The distance between the display element 62 indicating the vehicle 8 and the another vehicle 6 is denoted as $L_{2-4}$. The direction of the another vehicle 6 as seen from the vehicle 8 is denoted as $\theta_{1-4}$.

FIG. 16B is a state in which the vehicle 8 changes the lane and drives in parallel with the another vehicle 6. The distance between the display element 62 indicating the vehicle 8 and the another vehicle 6 is denoted as $L_{2-5}$. The direction of the another vehicle 6 as seen from the vehicle 8 is denoted as $\theta_{1-5}$. FIG. 16C is a state in which the vehicle 8 moves ahead of the another vehicle 6. In the process of transitioning from FIG. 16B to FIG. 16C, the display system 1 becomes no longer in the "state ready to directly point to the obstacle within the display area of the display system", and accordingly, the mode determining unit 23 determines that the display system 1 is to enter the first AR mode. The distance between the display element 62 indicating the vehicle 8 and the another vehicle 6 is denoted as $L_{2-6}$. The direction of the another vehicle 6 as seen from the vehicle 8 is denoted as $\theta_{1-6}$. Therefore, an inequality $L_{2-4} < L_{2-5} < L_{2-6}$ holds.

The smaller the distance $L_2$ between the display element 62 indicating the vehicle 8 and the obstacle is, the larger the interval D between the display element 62 indicating the vehicle 8 and the indicator image 61 becomes. Therefore, the interval $D_4$ of FIG. 16D corresponding to the state of FIG. 16A is $D_{max}$ close to the outer edge of the display area. The interval $D_5$ of FIG. 16E corresponding to the state of FIG. 16B is less than $D_4$. The interval $D_6$ of FIG. 16F corresponding to the state of FIG. 16C is $D_{min}$ because the display system 1 has switched to the first AR mode. Therefore, the occupant can easily find how far the obstacle is located with respect to the display element 62 indicating the vehicle 8.

The interval-&-size determining unit 24 determines the interval D from the distance $L_2$ using the correspondence between the distance $L_2$ and the interval D as illustrated in FIGS. 15A to 15C. The correspondence in the case where the display system 1 switches from the first AR mode to the second AR mode may not be the same as the correspondence in the case where the display system 1 starts from the second AR mode. For example, in the case where the display system 1 starts from the second AR mode but thereafter the distance $L_2$ increases, it is effective to maintain the large interval D even when the distance $L_2$ becomes large in order to clearly notify the occupant that the vehicle 8 has completely overtaken the another vehicle 6. This correspondence between the interval D and the distance $L_2$ corresponds to FIG. 15B.

In FIG. 16D to 16F, the angles of lines connecting the centers of the indicator image 61 and the display element 62 are almost the same as $\theta_{1-4}$, $\theta_{1-5}$, $\theta_{1-6}$, respectively. Therefore, the occupant can easily find in which direction the obstacle is located with respect to the display element 62 indicating the vehicle 8.

<Size of Indicator Image>

FIG. 17 is an example of a drawing for explaining the size of the indicator image. The smaller the distance $L_2$ between the display element 62 indicating the vehicle 8 and the obstacle is, the more greatly the interval-&-size determining unit 24 enlarges the indicator image 61. For example, the distance $L_2$ is divided into 10, and size information indicating a size of 1 to 10 is transmitted to the display image generation unit 25. The display image generation unit 25 enlarges (or shrinks), based on the size information, the indicator image 61 converted by the image conversion unit 22, and arranges the enlarged (or shrunk) indicator image 61 in the display area.

The smaller the distance $L_2$ is, the larger the interval D is. Therefore, as illustrated in FIG. 17, as display of the indicator image 61 becomes further outward, the size of the indicator image 61 becomes larger. For the sake of explanation, FIG. 17 illustrates three indicator images 61 corresponding to different distances from the same obstacle. As described above, the smaller the distance $L_2$ between the display element 62 indicating the vehicle 8 and the obstacle is, the larger the indicator image 61 becomes. Therefore, the occupant can easily notice the obstacle in proximity.

<Operation Procedure>

FIG. 18 is an example of a flowchart illustrating overall procedure of operation performed by an in-vehicle system. The processing of FIG. 18 is repeatedly executed when the in-vehicle system 2 is started (for example, by pressing a start button or turning ON the ignition).

First, the detecting unit 16 repeatedly executes detection of obstacles in surroundings (S1). As a result, a distance and a direction or a coordinate of each obstacle with respect to the center of the vehicle are detected.

Next, the recognizing unit 15 recognizes the types of the obstacles, and recognizes the relative position of each of the obstacles (S2). The types of the obstacles include another vehicle 6, a pedestrian, a two-wheeled vehicle, or others. The another vehicle 6 may be further classified into a large vehicle, a medium-sized vehicle, a standard-sized vehicle, a commercial vehicle, and the like. The pedestrian may be further classified into an adult, a child, a man, a woman, a person in a wheelchair, and the like. Others include terrestrial objects such as a guardrail, a building, a tree, and the like.

The display system 1 receives a type and a relative position (e.g., a direction and a distance) of the obstacle such as a vehicle speed from the recognizing unit 15, and determines whether the obstacle is of a type of an obstacle for which the display system 1 is to display an indicator image 61 (S3). The types of obstacles for which the indicator images 61 are to be displayed are assumed to be moving obstacles such as another vehicle 6, a pedestrian, a two-wheeled vehicle, and the like. Since the terrestrial objects do not move (the terrestrial objects do not overtake the vehicle 8 and seldom exist on the road), the terrestrial objects are excluded from the display of indicator images 61. Conversely, although, in a case of another vehicle 6, a pedestrian, and a two-wheeled vehicle being at a stop on the road surface, indicator images 61 may be displayed to indicate the another vehicle 6, the pedestrian, and the two-wheeled vehicle, they may be treated in a manner similar to the terrestrial objects when they are at a stop.

In a case where the determination in step S3 is Yes, the display system 1 starts display processing of the indicator image 61 (S4).

FIG. 19 is a flowchart illustrating processing of an example in which the display system 1 displays an indicator image 61.

The information acquiring unit 21 determines whether the obstacle exists within a predetermined distance (S11). This predetermined distance is a distance at which the occupant is to be notified that there is an obstacle which may relatively approach the vehicle 8. For example, the detection range of the blind spot monitor is about 2 meters to 3 meters from the end of the vehicle 8. Also, since the speed at which the obstacle approaches depends on the direction, the predetermined distance of step S11 may differ depending on the direction of the obstacle. Alternatively, a determination may be made according to a TTC.

In a case where the determination in step S11 is No, the processing proceeds to step S20 and the indicator image 61 is hidden. More specifically, the display image generation unit 25 does not display the indicator image 61 if the indicator image 61 has not yet been displayed, and hides the indicator image 61 if the indicator image 61 has already been displayed.

If the determination in step S11 is Yes, the mode determining unit 23 determines whether the display system 1 is in a state ready to directly point to an obstacle within the display area of the virtual image I (S12). As described above, this determination is made by comparing, with a threshold value, the direction $\theta_2$ of the obstacle with respect to the display element 62 indicating the vehicle 8 (i.e., an angle made by a straight line connecting the display element 62 indicating the vehicle 8 on the virtual image I and the obstacle). Alternatively, this determination may be made based on the direction $\theta_1$ of the obstacle with respect to the vehicle 8.

In a case where the determination in step S12 is No, the mode determining unit 23 sets a first flag to ON (S13). The first flag indicates that, with regard to the obstacle in question, the display system 1 has entered the first AR mode at least once.

Next, with the display element 62 indicating the vehicle 8 being at the center, the display image generation unit 25 arranges the indicator image 61, which is converted by the image conversion unit 22 and which points to the obstacle, with the interval D being $D_{min}$ (S14). The position where the display element 62 is arranged is in the direction $\theta_1$ with respect to the display element 62.

In a case where the determination in step S12 is Yes, the mode determining unit 23 sets a second flag to ON (S15). The second flag indicates that, with regard to the obstacle in question, the display system 1 has entered the second AR mode at least once.

Next, since the display system 1 is in the second AR mode, the interval-&-size determining unit 24 determines the interval D and the size of the indicator image 61 on the basis of the distance $L_2$ between the display element 62 indicating the vehicle 8 and the obstacle (S16).

The display image generation unit 25 enlarges or shrinks the indicator image 61 according to the size information, and arranges the indicator image 61 at a position in the display area determined by the interval D and the direction $\theta_1$ of the obstacle with respect to the vehicle 8 (S17).

Next, the mode determining unit 23 determines whether or not the first flag is ON and the second flag is ON and the obstacle has come into the field of view of the occupant (for example, the driver) (S18). In a case where the first flag is ON and the second flag is ON, it can be estimated that the obstacle has moved forward from the rear of the vehicle 8. In a case where the first flag is OFF and the second flag is ON, it can be estimated that the obstacle has come from the front of the vehicle 8. However, the obstacle never or seldom if ever comes into the field of view while the first flag is ON and the second flag is OFF.

Therefore, when the determination of step S18 is Yes, the mode determining unit 23 determines to terminate the display of the indicator image 61, and the display image generation unit 25 hides the indicator image 61 (S20).

In a case where the determination in step S18 is No, the mode determining unit 23 determines whether the second flag is ON and the another vehicle 6 has been in the field of view of the occupant (e.g., the driver) for a period of time equal to or more than a threshold value (S19). This is to prevent the indicator image 61 from being displayed indefinitely in the case where the display system 1 starts from the second AR mode but the vehicle 8 is in a traffic jam or the another vehicle 6 is making a right or left turn.

In a case where the determination in step S19 is Yes, the mode determining unit 23 determines to terminate the display of the indicator image 61, and the display image generation unit 25 hides the indicator image 61 (S20).

In the case where the determination in step S19 is No, the processing returns to step S11. In this case, the display system 1 enters the first AR mode, and thereafter, when the obstacle is no longer within the predetermined distance, the indicator image 61 is hidden.

Thus, the display system 1 according to the present embodiment can transition seamlessly to the second AR mode even when starting from the first AR mode, and can seamlessly transition to the first AR mode even when starting from the second AR mode. In addition, the display system 1 according to the present embodiment can hide the indicator image 61 when another vehicle 6 comes into the field of view, thereby alleviating annoyance.

<Display Example in which Indicator Image is Hidden where Obstacle Comes into the Field of View>

FIGS. 20A to 20F are drawings for explaining display examples in which an indicator image 61 is hidden in a case where the obstacle comes into the field of view of the occupant. As illustrated in FIG. 20A, the vehicle 8 is going through an intersection, and another vehicle 6 is approaching from the right-hand side. The mode determining unit 23 determines that the display system 1 is in the state ready to directly point to the obstacle in the display area, and the display system 1 displays the indicator image 61 pointing in the direction of the another vehicle 6 in the second AR mode (FIG. 20B). Since the distance $L_2$ between the display element 62 indicating the vehicle 8 and the another vehicle 6 is large, the interval D is small, and the size of the indicator image 61 is small.

Next, as illustrated in FIG. 20C, the another vehicle 6 starts to turn right at the intersection. Subsequently, the mode determining unit 23 determines that the display system 1 is in the state ready to directly point to the obstacle in the display area, and the display system 1 displays the indicator image 61 pointing in the direction of the another vehicle 6 in the second AR mode (FIG. 20D). Since the distance $L_2$ between the display element 62 indicating the vehicle 8 and the another vehicle 6 is short, the interval D is large, and the size of the indicator image 61 is large.

In the state of FIG. 20C, the another vehicle 6 has been in the field of view of the occupant for a period of time equal to or more than the threshold value (FIG. 20E). The mode determining unit 23 determines to hide the indicator image 61, and therefore, as illustrated in FIG. 20F, the display system 1 hides the indicator image 61.

<Display Example in which Indicator Image Points to Another Parked Vehicle>

FIGS. 21A and 21B are drawings for explaining display examples in which an indicator image 61 points to another parked vehicle 6. As illustrated in FIG. 21A, another vehicle 6 is parked at the left front side of the vehicle 8, and the vehicle 8 is approaching the another parked vehicle 6. The mode determining unit 23 determines that the display system 1 is in the state ready to directly point to the obstacle in the display area, and the display system 1 displays the indicator image 61 pointing in the direction of the another vehicle 6 in the second AR mode (FIG. 21B). Since the distance $L_2$ between the display element 62 indicating the vehicle 8 and the another vehicle 6 is short, the interval D is large, and the indicator image 61 is also large.

As illustrated in FIGS. 21A and 21B, in the second AR mode, the indicator image 61 directly points in the direction of the another vehicle 6 with the display element 62 indicating the vehicle 8 being at the center. Therefore, the display system 1 can easily warn the occupant of presence of another vehicle 6.

<Display Example of Indicator Image 61 when Second AR Mode is Started>

As illustrated in FIGS. 22A to 22F, when the second AR mode is started, the indicator image 61 may be emphasized in order to attract more attention. FIGS. 22A to 22F are drawings illustrating display examples of an indicator image 61 when the display system 1 enters the first AR mode and transitions to the second AR mode.

First, FIGS. 22A and 22B are display examples of the display element 62 indicating the vehicle 8 before the first AR mode is started. As illustrated in FIG. 22A, the another vehicle 6 is cruising in an adjacent lane behind the vehicle 8. Since the detecting unit 16 does not detect the another vehicle 6 or, even if the detecting unit 16 does detect the another vehicle 6, the another vehicle 6 is a predetermined distance or more away from the vehicle 8, the display system 1 does not display the indicator image 61 as illustrated in FIG. 22B. Therefore, the display system 1 displays only the display element 62 indicating the vehicle 8.

Next, as illustrated in FIG. 22C, the another vehicle 6 approaches the left rear side of the vehicle 8. Since the detecting unit 16 detects the another vehicle 6 and the another vehicle approaches within the predetermined distance, the display system 1 starts displaying the indicator image 61 as illustrated in FIG. 22D. The indicator image 61 points to the another vehicle 6.

Next, as illustrated in FIG. 22E, the indicator image 61 attains the state ready to directly point to the obstacle in the display area, and the display system 1 transitions to the second AR mode. At this occasion, as illustrated in FIG. 22F, the display image generation unit 25 repeats, in a short period of time, displaying the indicator image 61 at positions approaching the obstacle and moving away from the obstacle in the direction of the obstacle. For example, the indicator image 61 may reciprocally move in a narrow range on a straight line connecting the display element 62 indicating the vehicle 8 and the obstacle (for example, about 10 to 20% of the interval $D_{max}$). Alternatively, for example, the indicator image 61 may bounce.

As described above, when the second AR mode is started, the indicator image 61 is emphasized, so that attention can be attracted more significantly. As a method for emphasis, the indicator image 61 may be temporarily enlarged, blinked, or temporarily increased in luminance. Similar emphasis processing may be performed when the first AR mode is started.

<Display Example of Indicator Image and Display Element Indicating Vehicle in Question>

Several display examples of indicator images 61 and display elements 62 indicating the vehicle 8 will be explained with reference to FIGS. 23A to 23E.

First, the display element 62 indicating the vehicle 8 is not limited to the vehicle speed. In addition to the vehicle speed, information that can be acquired from the inside of the vehicle or information that can be acquired from the outside via the Internet or the like can be used as the display element 62. Further, the display element 62 may be a vehicle icon as illustrated in FIG. 23A, for example. In addition, a symbolic figure, a symbol, a mark, a character, or the like of the vehicle 8 can be the display element 62 indicating the vehicle 8. When the vehicle speed is not the display element 62, the vehicle speed is preferably displayed continuously, and accordingly, the icon is displayed at the left, right, lower or upper side of the vehicle speed depending on the direction $\theta_1$ of the obstacle with respect to vehicle 8. For example, when an obstacle is at the left side of the vehicle 8, the icon is displayed at the left side of the vehicle speed. When an obstacle is at the right side of the vehicle 8, the icon is displayed at the right side of the vehicle speed. When obstacles approach from both sides of the vehicle 8, the icons of the vehicle are displayed at both sides of the vehicle speed.

In addition, the indicator image 61 is arranged in the same direction as the direction $\theta_1$ of the obstacle with respect to the vehicle 8 with the icon being at the center. FIGS. 23A to 23E illustrate examples of obstacles approaching from the left side of the vehicle 8.

FIG. 23B is an example of an indicator image 61. In FIG. 23B, a triangular mark 71 is adopted as the indicator image 61. In the first AR mode, the triangular mark 71 rotates along a circular mark 72 to indicate the obstacle. In the second AR mode, the triangular mark 71 moves away from the circular mark 72 and points to the obstacle.

FIG. 23C is an example of an indicator image 61. In FIG. 23C, a convex part 73 is adopted as the indicator image 61. In the first AR mode, a direction mark 74 integrated with the convex part 73 rotates to point to the obstacle (as if a compass). In the second AR mode, the convex part 73 is separated from the direction mark 74 to become a triangular mark 75 pointing to the obstacle.

FIG. 23D is a display example of a plurality of indicator images 61. The number of indicator images 61 that can be displayed at a time in the display area of the virtual image I is not limited to one, and as many indicator images 61 as the number of detected obstacles can be displayed. A predetermined number of indicator images 61 may be displayed in the ascending order of the distance $L_1$ from the vehicle 8.

FIG. 23E is also a display example of a plurality of indicator images 61. When a plurality of indicator images 61 are displayed, one of the indicator images 61 may be displayed in the first AR mode, and another of the indicator images 61 may be displayed in the second AR mode.

SUMMARY

As described above, the display system according to the present embodiment seamlessly transitions from the first AR mode to the second AR mode. In the second AR mode, the indicator image moves in the direction approaching the obstacle while pointing in the direction of the obstacle, which allows to easily find the distance and the direction. According to the change in relative position between the display element 62 indicating the vehicle 8 and the another vehicle 6, the indicator image 61 pointing in the direction of the another vehicle 6 in the first AR mode moves toward the outside of the display area while changing the pointing direction and eventually, directly points to the another vehicle 6. Therefore, the display system enables continuous warning against obstacles even in a limited display area. In this way, even in a display system that displays information in front of the vehicle as viewed from the occupant, the presence of obstacles in surroundings can be appropriately presented to the occupant with a limited display area.

Other Suitable Examples

As described above, the best mode for carrying out the present invention has been described with reference to embodiments, but the present invention is not limited to these embodiments, and various modifications and substitutions can be applied within a range that does not depart from the gist of the present invention.

For example, a display element indicating another vehicle 6 may be displayed. In this case, the display element 62 indicating the vehicle 8, the indicator image 61, and the display element indicating the another vehicle 6 are displayed on a straight line. In this case, the display element representing the another vehicle 6 may be changed according to the type of the obstacle.

The shape and the like of the indicator image 61 may be changed according to the type of the obstacle. In a case where the indicator image 61 is enlarged, the display element 62 indicating the vehicle 8 may be shrunk. As a result, due to optical illusion, the indicator image 61 appears to be larger and the interval D also appears to be larger. Alternatively, the display element 62 indicating the vehicle 8 may be made inconspicuous, for example, by reducing the luminance.

The indicator image 61 does not always have to be at the center of the virtual image I, and the indicator image 61 may be arranged close to the front, back, left or right. Alternatively, the indicator image 61 may also move dynamically. For example, in a case where another vehicle 6 approaches the vehicle 8 from the left, the display element 62 indicating the vehicle 8 may be arranged close to the right side to leave a large space at the left side of the display element 62 indicating the vehicle 8, so that a longer distance can be preserved for the indicator image 61 to move.

In addition, the indicator image 61 does not necessarily have to be displayed with AR, and even when the indicator image 61 is displayed with AR, the indicator image 61 does not have to be displayed along the road surface. For example, the indicator image 61 may float above the road surface.

The display system 1 may be a liquid crystal display. Also, the display control unit 20 and the display unit 10 may be separate from each other, such as being distributed separately. For example, a smartphone may be adopted as the display control unit 20 to display information on a display built in the smartphone, or to display a virtual image on a combiner.

Further, the information displayed by the display system 1 is not limited to the vehicle speed, and the display system 1 can display information that can be acquired from the inside of the vehicle or information that can be acquired from the outside via the Internet or the like.

Also, the position of the display element 62 indicating the vehicle 8 does not have to be at the center of the display area of the virtual image I, and may be displayed at the right-hand side, left-hand side, or both sides with respect to the center of the display area according to the direction $\theta_1$ of the obstacle with respect to the vehicle.

Also, in the configuration example such as FIG. 9, the functions of the display control unit 20 are roughly divided into the processing units in order to facilitate the understanding of processing performed by the display control unit 20. The invention of the present application is not limited by the way the functions are divided into the processing units or the names given to the processing units. The functions of the display control unit 20 can be divided into a larger number of processing units depending on the processing content. Alternatively, the functions of the display control unit 20 can be divided in such a manner that a single processing unit performs more processing.

Each function of the embodiment described above can be implemented by one or a plurality of processing circuits. The "processing circuit" in this specification includes devices such as a processor programmed to execute the functions by software, such as a processor implemented by an electronic circuit, an ASIC (Application Specific Integrated Circuit), a DSP (digital signal processor), an FPGA (field programmable gate array), which are designed to execute the functions described above, and conventional circuit modules.

REFERENCE SIGNS LIST

1 display system
2 in-vehicle system
9 vehicle
10 display apparatus
11 car navigation system
20 display control unit

CITATION LIST

Patent Literature

[PTL 1] Japanese Patent Publication No. 6303428

The present application is based on and claims the benefit of priority of Japanese Priority Application No. 2019-053391 filed on Mar. 20, 2019, the entire contents of which are hereby incorporated herein by reference.

The invention claimed is:

1. A display control apparatus to display a virtual image in front of a moving body through a transparent member, the display control apparatus comprising:
   information acquiring circuitry configured to acquire information about an obstacle around the moving body;
   display image generation circuitry configured to generate, based on the information, data of an indicator image which points in a direction of the obstacle in the virtual image and which is moved in the direction of the obstacle to approach the obstacle; and
   output circuitry configured to output the virtual image based on the data, wherein
   the virtual image includes the indicator image and a display element image corresponding to the moving body, and
   the display image generation circuitry generates the data such that (1) an interval between the indicator image and the display element image in the virtual image is varied according to a corresponding distance between the moving body and the obstacle, and (2) the indicator image is rotated according to the direction of the obstacle with respect to the moving body.

2. The display control apparatus according to claim 1, wherein the display image generation circuitry generates the data such that the indicator image moves in the direction of the obstacle to approach the obstacle from a predetermined area in the virtual image.

3. The display control apparatus according to claim 2, wherein the predetermined area has a center located at a display element image.

4. The display control apparatus according to claim 1, wherein the display image generation circuitry generates the data such that the indicator image is in proximity to the display element image, the display element image is at a center of the virtual image, and the indicator image points in the direction of the obstacle with respect to the moving body indicated by the display element image.

5. The display control apparatus according to claim 4, wherein the display image generation circuitry generates the data such that the indicator image gradually moves away from the display element image in the direction of the obstacle in accordance with the information.

6. The display control apparatus according to claim 5, wherein the display image generation circuitry generates the data such that the interval is increased as a distance between the obstacle and the moving body decreases.

7. The display control apparatus according to claim 5, wherein the display image generation circuitry generates the data such that the indicator image increases in size as a distance between the obstacle and the moving body in the virtual image decreases.

8. The display control apparatus according to claim 4, wherein
   the display image generation circuitry is further configured to switch between a first mode and a second mode in accordance with the direction of the obstacle with respect to the moving body included in the information about the obstacle,
   in the first mode, the display image generation circuitry generates the data such that the indicator image is arranged in proximity to the display element image at a center of the virtual image, and
   in the second mode, the display image generation circuitry generates the data such that the indicator image moves in the direction of the obstacle within the virtual image in accordance with the information about the obstacle.

9. The display control apparatus according to claim 1, wherein the display image generation circuitry is further configured to, upon determining that the obstacle has come into a field of view of an occupant of the moving body on the basis of the information about the obstacle, adjust the data such that the virtual image, output by the output circuitry, does not include the indicator image.

10. The display control apparatus according to claim 3, wherein the display element image indicates a vehicle speed of the moving body.

11. The display control apparatus according to claim 3, wherein the display image generation circuitry generates the data such that the indicator image increases in brightness as a distance between the obstacle and the moving body presented as the virtual image decreases.

12. A display apparatus configured to acquire the indicator image from the display control apparatus according to claim 1, and allow an occupant of the moving body to visually recognize the virtual image in front of a front windshield by projecting the indicator image onto the front windshield.

13. A display system comprising:
the display control apparatus according to claim 1; and
a display apparatus configured to acquire the indicator image from the display control apparatus, and allow an occupant of the moving body to visually recognize the virtual image in front of a front windshield by projecting the indicator image onto the front windshield.

14. A moving body equipped with the display system according to claim 13.

15. The display control apparatus according to claim 1, wherein
the display image generation circuitry generates the data such that the indicator image transmits a from a first state to a second state,
in the first state, a part of, but not all of, the indicator image is within a predetermined area of the virtual image such that only the part of the indicator image is output, and
in the second state, all of the indicator image is within the predetermined area of the virtual image such that all of the indicator image is output.

16. A non-transitory computer readable recording medium storing computer instructions, which when executed by a computer, causes a method to be performed, comprising:
acquiring information about an obstacle around the moving body;
generating, based on the information, data of an indicator image which points in a direction of the obstacle in the virtual image and which is moved in the direction of the obstacle to approach the obstacle; and
outputting the virtual image based on the data, wherein
the virtual image includes the indicator image and a display element image corresponding to the moving body, and
the generating includes generating the data such that (1) an interval between the indicator image and the display element image in the virtual image is varied according to a corresponding distance between the moving body and the obstacle, and (2) the indicator image is rotated according to the direction of the obstacle with respect to the moving body.

17. An image generation method performed by a display control apparatus displaying information on a display apparatus provided in a moving body, the image generation method comprising:
acquiring, by an information acquiring circuitry, information about an obstacle around the moving body;
generating, by a display image generation circuitry and based on the information, data of an indicator image which points in a direction of the obstacle in the virtual image and which is moved in the direction of the obstacle to approach the obstacle; and
outputting, by an output circuitry, the virtual image based on the data, wherein
the virtual image includes the indicator image and a display element image corresponding to the moving body, and
the display image generation circuitry generates the data such that (1) an interval between the indicator image and the display element image in the virtual image is varied according to a corresponding distance between the moving body and the obstacle, and (2) the indicator image is rotated according to the direction of the obstacle with respect to the moving body.

18. The non-transitory computer readable recording medium according to claim 16, wherein
the generating includes generating the data such that the indicator image transmits a from a first state to a second state,
in the first state, a part of, but not all of, the indicator image is within a predetermined area of the virtual image such that only the part of the indicator image is output, and
in the second state, all of the indicator image is within the predetermined area of the virtual image such that all of the indicator image is output.

19. The image generation method according to claim 17, wherein
the generating includes generating the data such that the indicator image transmits a from a first state to a second state,
in the first state, a part of, but not all of, the indicator image is within a predetermined area of the virtual image such that only the part of the indicator image is output, and
in the second state, all of the indicator image is within the predetermined area of the virtual image such that all of the indicator image is output.

* * * * *